US009800942B2

(12) United States Patent
Suzuki et al.

(10) Patent No.: US 9,800,942 B2
(45) Date of Patent: Oct. 24, 2017

(54) SYSTEMS AND METHODS FOR POSITIONING A SATELLITE UPLINK DEVICE

(71) Applicant: The Roger B and Ann K McNamee Trust U/T/A/D, Woodside, CA (US)

(72) Inventors: Shinya Suzuki, Menlo Park, CA (US); Roger McNamee, Menlo Park, CA (US); Glenn Evans, Menlo Park, CA (US); Mark Richards Frederick, Sandy, UT (US)

(73) Assignee: THE ROGER B. AND ANN K. MCNAMEE TRUST U/T/A/D, Menlo Park, CA (US)

( * ) Notice: Subject to any disclaimer, the term of this patent is extended or adjusted under 35 U.S.C. 154(b) by 0 days.

(21) Appl. No.: 14/218,647

(22) Filed: Mar. 18, 2014

(65) Prior Publication Data

US 2014/0325569 A1 Oct. 30, 2014

Related U.S. Application Data

(60) Provisional application No. 61/801,453, filed on Mar. 15, 2013.

(51) Int. Cl.
| | |
|---|---|
| *H04N 21/61* | (2011.01) |
| *H04N 21/21* | (2011.01) |
| *H04N 7/20* | (2006.01) |
| *H04H 20/74* | (2008.01) |
| *H04N 21/6338* | (2011.01) |
| *H04N 21/2187* | (2011.01) |

(52) U.S. Cl.
CPC ........ *H04N 21/6193* (2013.01); *H04H 20/74* (2013.01); *H04N 7/20* (2013.01); *H04N 21/2187* (2013.01); *H04N 21/6338* (2013.01)

(58) Field of Classification Search
CPC ........... H04N 21/6193; H04N 21/6143; H04N 21/47202; H04N 7/20; H04N 7/17327
USPC .................................................. 725/63–72
See application file for complete search history.

(56) References Cited

U.S. PATENT DOCUMENTS

| | | | |
|---|---|---|---|
| 7,398,051 B1* | 7/2008 | Bates et al. ................. | 455/12.1 |
| 7,716,708 B2* | 5/2010 | Nishimura ............ | G06Q 10/02 |
| | | | 725/93 |

(Continued)

*Primary Examiner* — Pankaj Kumar
*Assistant Examiner* — Alazar Tilahun
(74) *Attorney, Agent, or Firm* — Morgan, Lewis & Bockius LLP; Brett A. Lovejoy

(57) ABSTRACT

A computer-implemented method is provided in which a satellite uplink device is positioned to distribute an event. Data is collected from one or more automatic sensor device associated with the satellite uplink device. An optimal position of the satellite uplink device is calculated based on at least the data collected from the one or more sensor devices. The location of one or more satellites in orbit is determined and one or more satellites are selected as a preferred satellite. The satellite uplink device is automatically positioned in the calculated optimal position to connect with the preferred satellite without user intervention. However, a user at a remote location may communicate instructions to change the position the satellite uplink device. User instructions are converted into one or more actuator commands and are wirelessly transmitted to the satellite uplink device for changing its position.

23 Claims, 17 Drawing Sheets

(56) References Cited

U.S. PATENT DOCUMENTS

| | | | |
|---|---|---|---|
| 8,432,808 B1* | 4/2013 | Dankberg | H04L 67/325 |
| | | | 370/235 |
| 2003/0035386 A1* | 2/2003 | Sullivan | 370/316 |
| 2003/0204850 A1* | 10/2003 | Ng et al. | 725/63 |
| 2008/0237399 A1* | 10/2008 | Caplin | B64G 1/1085 |
| | | | 244/158.4 |
| 2011/0001663 A1* | 1/2011 | Anand et al. | 342/357.23 |

* cited by examiner

Satellite auto-acquire lookup table 1300

| Satellite identifier 1301 | Available upload bandwidth 1302 | Available download bandwidth 1303 | Pricing 1304 | Provider 1305 | Coverage 1306 | Signal Strength 1307 | Availability 1308 | Current Status 1310 | |
|---|---|---|---|---|---|---|---|---|---|
| SAT_001 | 100 Mbps | 1 Gbps | $6,000/ day | DISH Network | North America | High | Yes | Connected | 1352 |
| SAT_002 | 5 Mbps | 1 Mbps | $500/ hour | HughesNet | Asia | High | No | No | 1354 |
| SAT_003 | 10 Mbps | 5 Mbps | $20,000/year | Exede | Africa | Medium | Yes | Backup #1 | 1356 |
| SAT_004 | 1.5 Mbps | 256 Kbps | $900/month | WildBlue | Palo Alto, CA, USA | Low | Yes | Backup #2 | 1358 |

Figure 13

SYSTEMS AND METHODS FOR POSITIONING A SATELLITE UPLINK DEVICE

RELATED APPLICATION

This application claims priority to U.S. Provisional Patent Application No. 61/801,453, filed on Mar. 15, 2013, which is hereby incorporated by reference in its entirety.

TECHNICAL FIELD

The disclosed implementations relate generally to positioning a satellite uplink device to distribute an audio/video feed of a live event via a satellite.

BACKGROUND

Broadcasting events live has become increasingly important. For example, a baseball fan may prefer watching a baseball game live on a cable network, rather than viewing a rerun several hours (or sometimes, even days) after the game has finished and its score published. A central goal of the organizers and producers of a live event, such as a concert, is to get the content of the live event distributed to a wide audience. Aside from assuring sufficient financial compensation to make the live event commercially feasible, the most fundamental measure of the success of the live event is how many people participated in, viewed, or listened to the live event. With the advent of the Internet and other avenues for delivering live content, many more people are interested in, and have the ability to conveniently view and participate in live events—whether it be a baseball game, a concert or an academic lecture. Broadcasting live events via satellite is a viable option to overcome these hurdles. However, event organizers are not likely to have the technical skills or staff to make finding, connecting to and troubleshooting a connection to a satellite in orbit easy.

Given the above background, what is needed in the art are systems and methods for positioning a satellite uplink device to distribute an audio or visual feed of a live event.

SUMMARY

It would be advantageous to provide a mechanism and method for positioning a satellite uplink device to distribute an audio or visual feed of a live event. The present disclosure overcomes the limitations and disadvantages described above by providing methods, systems, and computer readable storage mediums for positioning a satellite uplink device to distribute an audio or visual feed of a live event.

The following presents a summary of the disclosed implementations in order to provide a basic understanding of some of the aspects of the present disclosure. This summary is not an extensive overview of the present disclosure. It is not intended to identify key/critical elements of the present disclosure or to delineate the scope of the present disclosure. Its sole purpose is to present some of the concepts of the present disclosure in a simplified form as a prelude to the more detailed description that is presented later.

Various implementations of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations are used Some implementations provide a computer-implemented method in which a satellite uplink device can be positioned by a user device or a system having one or more processors and memory storing one or more programs for execution by the one or more processor. The user device or the system collects data from one or more automatic sensor devices associated with the satellite uplink device. The location of one or more satellites in orbit is determined and one or more satellite in orbit is selected as a preferred satellite. An optimal position of the satellite uplink device is calculated so that the satellite uplink device can connect with the preferred satellite. These calculations are based on at least the data collected from the one or more sensor devices. Actuator commands are provided to position the satellite uplink device in the calculated optimal position and the satellite uplink device is positioned in the optimal position without human intervention.

Some implementations provide a system comprising one or more central processing units, CPU(s), for executing programs and also include memory sorting the programs to be executed by the CPUs. The programs include instructions to perform any of the implementations of the aforementioned method. Some implementations of a system also include program instructions to execute the additional options discussed above.

Yet other implementations provide a computer readable storage medium storing one or more programs configured for execution by a computer. The programs include instructions to perform any of the implementations of the aforementioned method. Some implementations of a computer readable storage medium also include program instructions to execute the additional options discussed above.

In some implementations, a method for controlling a satellite uplink device to be positioned to distribute an audio or visual feed of a live event includes: obtaining data from one or more automatic sensor devices associated with a satellite uplink device; determining the location of one or more satellites in orbit; selecting a preferred satellite of the one or more satellites; calculating an optimal position of the satellite uplink device to connect with the preferred satellite based on at least the data collected from the one or more sensor devices; and providing actuator commands to position the satellite uplink device in the calculated optimal position, where one or more actuators are configured to automatically position the satellite uplink device to said calculated optimal position without human intervention.

In some implementations, a method for positioning a satellite uplink device to distribute an audio or visual feed of a live event includes: at a satellite uplink device, collecting data from one or more automatic sensor devices associated with the satellite uplink device; determining the location of one or more satellites in orbit; selecting a preferred satellite of the one or more satellites; calculating an optimal position of the satellite uplink device to connect with the preferred satellite based on at least the data collected from the one or more sensor devices; providing actuator commands to position the satellite uplink device in the calculated optimal position; and automatically positioning the satellite uplink device in the calculated optimal position without user intervention. The satellite uplink device includes one or more processors and memory storing one or more programs for execution by the one or more processors.

In some implementations, the preferred satellite is selected from the one or more satellites automatically without human intervention.

In some implementations, the preferred satellite is automatically selected responsive to a predefined user action on the satellite uplink device.

In some implementations, the preferred satellite is automatically selected responsive to a predefined user action on a user device communicably connected with the satellite uplink device.

In some implementations, the user device includes one of: a smart phone, a tablet, or a laptop.

In some implementations, the preferred satellite is selected from the one or more satellites in accordance with transmission speed associated with a respective satellite in the one or more satellites.

In some implementations, the preferred satellite is selected from the one or more satellites in accordance with pricing information associated with a respective satellite in the one or more satellites.

In some implementations, the preferred satellite is selected from the one or more satellites in accordance with a contractual relationship between a host of the live event and a service provider of the preferred satellite.

In some implementations, the preferred satellite is selected from one or more satellites in accordance with a lookup table.

In some implementations, for a respective satellite in the one or more satellites, the lookup table includes information representing: bandwidth, pricing information, satellite provider, satellite coverage, signal strength, and satellite availability.

In some implementations, the one or more satellites include satellites provided by multiple distinct commercial entities.

In some implementations, the multiple distinct commercial entities include one of: Pittsburgh International Telecommunications, DirecTV, DISH Network, Spiritcast, Sky Angel, GlobeCast World TV, Home2US, Arab Digital Distribution, Arab Radio and Television Network, Orbit Showtime, TopTV, Multichoice, HiTV, Infinity TV, ZAP, DSTV, Airtel digital TV, DD Direct+, Reliance Digital TV, Sun Direct, Tata Sky, Videocon d2h, Astro Nusantara, Indosat Mega Media/IM2, Indovision, TelkomVision, IRIB, SKY PerfecTV!, Astro, DDishTV_LLC, Dream Satellite TV, G Sat, Cignal Digital TV, Dialog TV, Peo TV, TrueVisions, Skylife, Dish Home, Austar, Foxtel, SelecTV, UBI World TV, Australia TV PLUS, Euro1080, Digit-Alb, Premiere, ORF, TV Vlaanderen Digitaal, Belgium Satellite Services, SatelliteBG, Bulsatcom, Vivacom, Digi TV, SEEMORE, NOVA Cyprus, SkyLink, CSLink, UPC Direct, Viasat, ABSat, CanalSat, TPS, Canal Digital, MagtiCom, Sky Deutschland, NOVA Greece, Digi TV, UPC Direct, T-home, Hello HD, Saorsat, Sky Italia, Cyfrowy Polsat, ZON TV Cabo, MEO Satélite, Orange TV, Dolce, Focus Sat, Kosmos TV, TV Plus, Orion Express, RIKOR TV, Russian TV Time, Tricolor TV Sibir, NTV Plus Vostok, Tricolor TV, TotalTV, Magio Sat, UPC Direct, Digital+, Satellite Media Switzerland, OBCOS Switzerland, Digiturk, D-Smart, Sky, Freesat, iSat LTD, NTV Plus Ukraine, Viasat Ukraine, ВОЛЯ (Cable), МаксИмум ТВ (MITRIS), Xtra TV, Bell TV, Shaw Direct, Spiritcast, Glorystar, Telus TV, Antina, SKY Brasil, Vivo TV, Oi TV, GVT TV, Telefónica TV Digital, Claro TV, Movistar TV Hogar, Cable Mágico Satelital, DirecTV Latin America, Tuves HD, Movistar Venezuela, SKY México, Dish México, and Cablevisión México.

Thus, these methods, systems provide new, less cumbersome, more efficient ways to position a satellite uplink device to distribute an audio or visual feed of a live event.

The present disclosure provides systems and methods for positioning a satellite uplink device to distribute an audio or visual feed of a live event (e.g., a concert, a speech, a rally, a protest, an athletic game, or a contest).

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 13 is a block diagram illustrating a satellite auto-acquire lookup table, in accordance with some implementations.

DETAILED DESCRIPTION

The present disclosure incorporates by reference, in its entirety, U.S. Patent Application Ser. No. 61/725,421, filed on Nov. 12, 2012, entitled "Systems and methods for communicating a live event to users using the Internet."

The present disclosure provides systems and methods for positioning a satellite uplink device to distribute an audio or visual feed of a live event (e.g., a concert, a speech, a rally, a protest, an athletic game, or a contest). Before dealing with the positioning of a satellite uplink device, some details are provided regarding techniques for distributing audio or video feed of a live event via a satellite.

These techniques may significantly increase viewing experience for viewers, and viewership and ratings for content providers (e.g., live performance artists or TV stations).

In some implementations, at a live event (e.g., a rock concert), audio and video data are collected from the event live, using several video cameras, and microphones. In some implementations, the video cameras include camcorders. The audio and video data are then mixed into mixed digital signals and streamed into bitrate streams. In some implementations, the bitrate streams are then transmitted to a geodetic satellite via a mobile VSAT (e.g., mounted on a vehicle). The satellite relays the bitrate streams to teleports located in various geographic locations where viewers may be found. In some implementations, the bitrate streams are then transcoded and delivered to one or more content delivery networks, which further deliver the bitrate streams to client devices, such as tablets, laptops, and smart phones, for user to view or to listen to.

In this way, in situations where (1) neither a cable network connection nor the Internet is available, or (2) performance of an existing cable network connection or Internet connection is inadequate (e.g., with only limited bandwidth or relatively high packet loss)-especially for broadcasting a live event, which may require a high speed connection to avoid delays detectable by a user-content providers would still be able to broadcast an event live, and thus viewers would also still be able to experience the event as it is happening. This approach is advantageous, because: (i) for viewers, viewing experience is enhanced; and (ii) consequently, for content providers, viewership and profitability are increased.

Additional details of implementations are now described in relation to the figures.

Figure 1A:
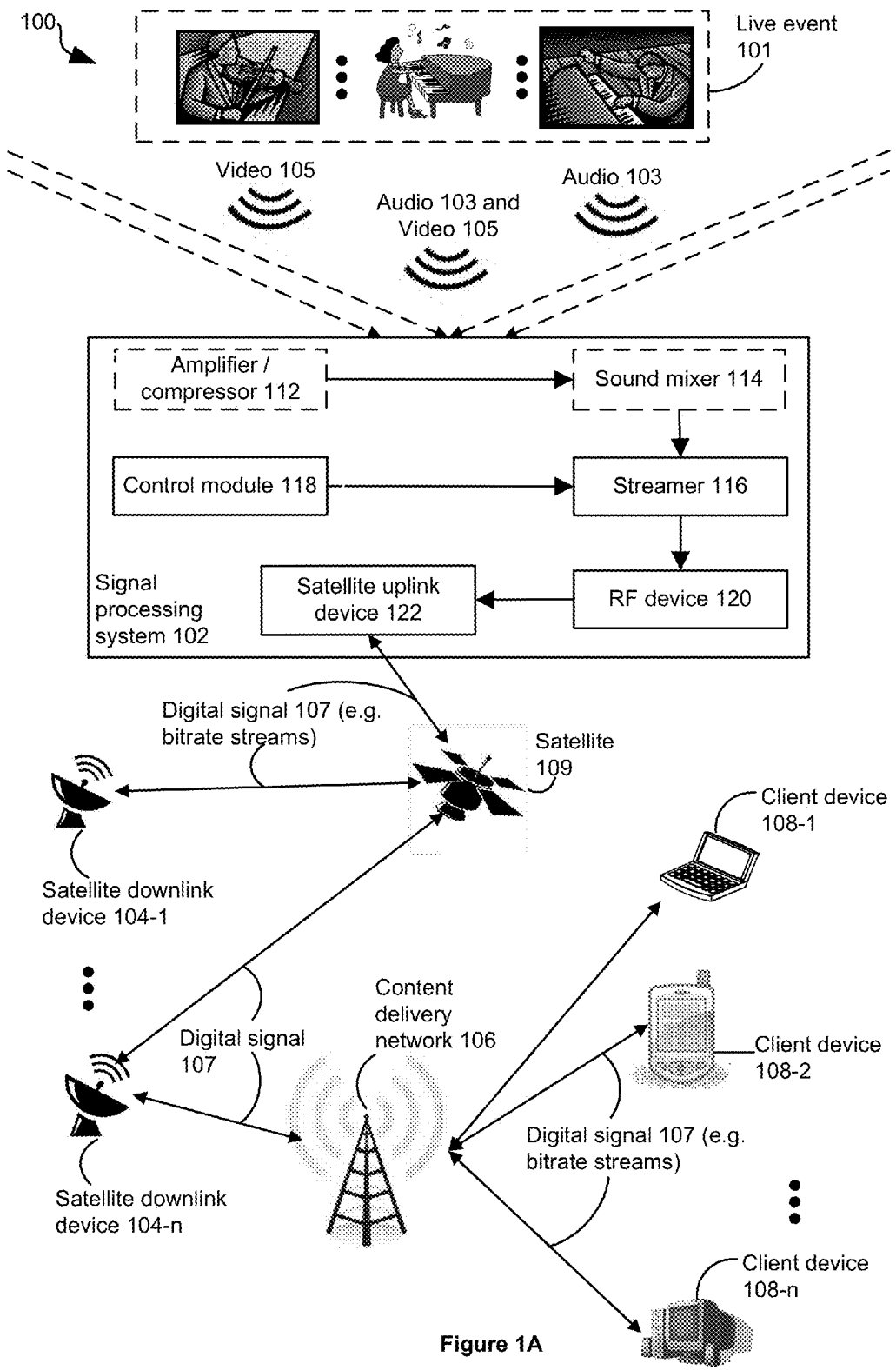
FIG. 1A is a block diagram illustrating a system for distributing audio/video feed of live event via a satellite, in accordance with some implementations.

FIG. 1A is a block diagram illustrating a system 100 for distributing audio/video feed of a live event via a satellite, in accordance with some implementations. In some implementations, the system 100 includes a signal processing system 102, a satellite 109, a satellite downlink device 104, a content delivery network 106, and one or more client devices 108.

In some implementations, a predefined number of microphones, or video cameras (or camcorders) are first positioned and configured to record a live event 101 (e.g., a live convert or a press conference).

In some implementations, as the live event is unfolding, the signal processing system 102 obtains video 105 or audio 103, or a portion thereof, from the live event 101 (e.g., a live concert, a live rave party, or a traffic accident). In some implementations, the video 105 is obtained via a camera or camcorder placed at a predefined position relative to the live event (e.g., at a 30 degree angle to a main artist or a primary musical instrument). In other implementations, the video 105 is obtained via a camera or a camcorder placed at a predefined position relative to an output from a display system in use at the live event 101 (e.g., within 3 feet of a LCD screen that is part of a display system at a rock concert).

In some implementations, the video camera/camcorder is a PANASONIC HPX-250, CANON XH A1, CANON XH G1, PANASONIC AG-HVX200, PANASONIC AG-DVX100B, SONY HDR-FX1, CANON XL2, CANON GL1, SONY HANDYCAM HDR-AX2000, PANASONIC AG-HMC150, PANASONIC AVCCAM AG-AC160, SONY HANDYCAM HDR-FX1000, PANASONIC AVC-CAM AG-AF100, SONY HVR-V1U, CANON XH A1S, SONY HVR-Z7U, CANON EOS C300, SONY HXR-NXSU, CANON XF100, CANON XL H1S, or CANON XF305 camera. In other implementations, the video camera/camcorder is a CANON GOPRO HERO3, a CANON GOPRO HERO2, CANON GOPRO HERO camera. SONY ACTION, LOGITECH WEBCAM C525, LOGITECH WEBCAM C270, LOGITECH WEBCAM C310, or a LOGITECH WEBCAM C110 camera.

In some implementations, the audio 103 is obtained via a microphone placed at a predefined position relative to the live event (e.g., at a 30 degree angle to a main artist or a primary musical instrument). In other implementations, the audio 103 is obtained via a microphone placed at a predefined position relative to an output from a sound system in use at the live event 101 (e.g., within 3 feet of a high-quality bass/treble speaker or a subwoofer that is part of a sound system at a rock concert). In some implementations, the microphone is a NEUMANN U87 Ai/SETZ, TLM-102, TLM 49, TLM 103, KMS 105 MT, TLM-102 ambient microphone, or a phantom-powered condenser microphone. In some implementations, the microphone is a SHURE SM-57, ROYER R-121, MXL 990, or a BLUE MICROPHONES YETI microphone.

In some implementations, the signal processing system 102 includes an amplifier/compressor 112 (optionally), a sound mixer 114 (optionally), a streamer 116, a control module 118, a RF device 120, and a satellite uplink device 122. In some implementations, the signal processing system 102 obtains audio or video (e.g., the audio 103 or video 105) from a live event, as analog signals, processes these signals, and transmits corresponding digital signals (e.g., bitrate streams) to a satellite, at predefined radio frequencies. In some implementations, the signal processing system 102 is mobile or portable—e.g., mounted on a vehicle, or collapsible and transportable in a trunk case—and can therefore provide on-the-go network connection at live events where an Internet connection or a cable network connection, with satisfactory performance or speed, is unavailable.

In some implementations, the optional amplifier/compressor 112 amplifies or compresses (audio or video) signals received from a microphone or a camera. In some implementations, where two or more (e.g., ambient) microphones or cameras are used to collect the audio or video signals, a matching number of amplifiers/compressors are used, with each microphone or camera having a corresponding amplifier/compressor. In some implementations, the amplifier/compressor 112 concurrently amplifies/compress audio or video signals in accordance with one or more predefined parameters, such as a predefined compression ratio, an attack time, or a release time.

In some implementations, the optional sound mixer 114 mixes (e.g., ambient) audio or video signals received from one or more microphones or cameras monitoring the live event 101, as well as signals from a sound or video board feed associated with the live event. In some implementations, the optional sound mixer 114 then produces a corresponding mixed signal. In other implementations, the sound mixer 114 mixes amplified or compressed (audio or video) signals received from the amplifier/compressor 112 (rather than directly from microphones or cameras), and produces a corresponding mixed signal.

In some implementations, the streamer 116 receives signals from the sound mixer 114, and produces one or more corresponding bitrate streams. In some implementations, the one or more bitrate streams are stored in one or more audio or video containers (e.g., MP4, 3GP, 3G2). In some implementations, where the sound mixer 114 is not in use, the streamer 116 receives signals from microphones or cameras collecting audio or video from the live event, and produces one or more corresponding bitrate streams.

In some implementations, the control module 118 controls or modifies the operation of the streamer 116, e.g., causing different encoders to be applied to signals received by the streamer, or delays to be inserted insert or removed from the bitrate streams. In some implementations, the control module 118 controls the streamer 116 via a wireless connection (e.g., wifi, bluetooth, radio, or infrared). In some implementations, the control module 118, or a portion thereof, is implemented as a software module (e.g., a smart phone or tablet application) or a hardware module (e.g., a remote control device).

In some implementations, the RF device 120 processes the one or more bitrate streams produced by the streamer 116, and transmits the processed streams as radio signals to the satellite uplink device 122. In some implementations, the radio signals are transmitted at one or more predefined frequency bands (ranges), e.g., 1-2 GHz, 2-4 GHz, 4-8 GHz, 8-12.5 GHz, 12.5 to 18 GHz, 18 to 26.5 GHz, and 26.5 to 40 GHz. In some implementations, the satellite uplink device 122 and the RF device 120 are wirelessly connected to each other. In some implementations, the RF device 120 is located on a floor, e.g., an elevated floor, of a building and the satellite uplink device 122 is located on the street near the building, in a parking garage near the building, or in a parking lot, alley, or yard near the building.

In some implementations, the satellite uplink device 122 locates a predefined satellite (e.g., using appropriate authorization credentials), and transmits the radio signals generated by the RF device 120 to the predefined satellite. In some implementations, the satellite uplink device 122 transmits digital signals 107, as opposed to analog signals, to the satellite 109.

In some implementations, the satellite 109 is a satellite owned or rented by the live event organizer. In some implementations, the satellite 109 is selected based on one or more predefined criteria (e.g., processing power, bandwidth, location, rental contract, pricing, or ownership). In some implementations, the satellite 109 is a geodetic satellite.

In some implementations, the satellite 109 relays the received radio signals to one or more satellite downlink devices located in one or more target areas. In other implementations, the satellite 109, acting as an intermediary, relays the received radio signals to one or more other satellites, which then deliver the radio signal to the one or more satellite downlink devices.

In some implementations, the one or more satellite downlink devices (e.g., satellite downlink devices 104-1 . . . 104-n) are determined based on a predefined set of criteria, such as potential viewership, predicted profitability, geographical location, population density in a target area, and processing power or ownership of a satellite downlink device. For example, to maintain a threshold performance level (e.g., to avoid no user-observable or -detectable delay on a client device), the satellite connects to at least 5 downlink devices in a highly-populated area, such as New York City, N.Y., where viewer demand is high. For another example, to maintain the threshold performance level, the satellite connects with high performance satellites but forgoes connections with low performance satellites.

In some implementations, the satellite downlink device 104 processes (e.g., transcodes) the digital signals 107 received from the satellite 109, and transmits the processed (e.g., transcoded) signals to a content delivery network 106. In some implementations, a satellite downlink device includes a teleport. In other implementations, a satellite downlink device includes an XM satellite radio receiver.

In some implementations, the satellite downlink device is stationed at a predefined location. In other implementations, like the signal processing system 102, the satellite downlink device is also mobile (e.g., mounted on a vehicle, such as a recreational vehicle or a pickup truck, or a mobile structure, such as a mobile residence or a transportable trunk case). In other implementations, the satellite downlink device is built into a vehicle's sound system (e.g., part of a stereo sound system) or into a handheld device (e.g., an XM satellite hand-held receiver).

In some implementations, the content delivery network 106 further delivers with high quality (e.g., high definition) the digital signals received from the satellite downlink device 104 to one or more client devices 108. In some implementations, the content delivery network 106 includes a large distributed system of data servers located in multiple data centers on the Internet. In some implementations, the content delivery network 106 is configured to deliver to end-users (e.g., viewers) media content, with high availability and high performance. In some implementations, the owner of the content delivery network 106 and the owner of the satellite 109 share a predefined relationship (e.g., contractual, business, or organizational). In some implementations, the content delivery network 106 is owned by ATT, VERIZON, BELL, AMAZON, AKAMAI TECHNOLOGIES, EDGECAST NETWORKS, LEVEL 3 COMMUNICATIONS, or LIMELIGHT NETWORKS. In some implementations, the content delivery network 106 optionally includes the Internet, one or more local area networks (LANs), one or more wide area networks (WANs), other types of networks, or a combination of such networks.

In some implementations, the one or more client devices 108 include consumer electronics capable of playing media content, such as a smart phone, a tablet, a computer, a laptop, a desktop, a display, a TV, and a connected TV (a GOOGLE TV or an APPLE TV device).

Figure 2:
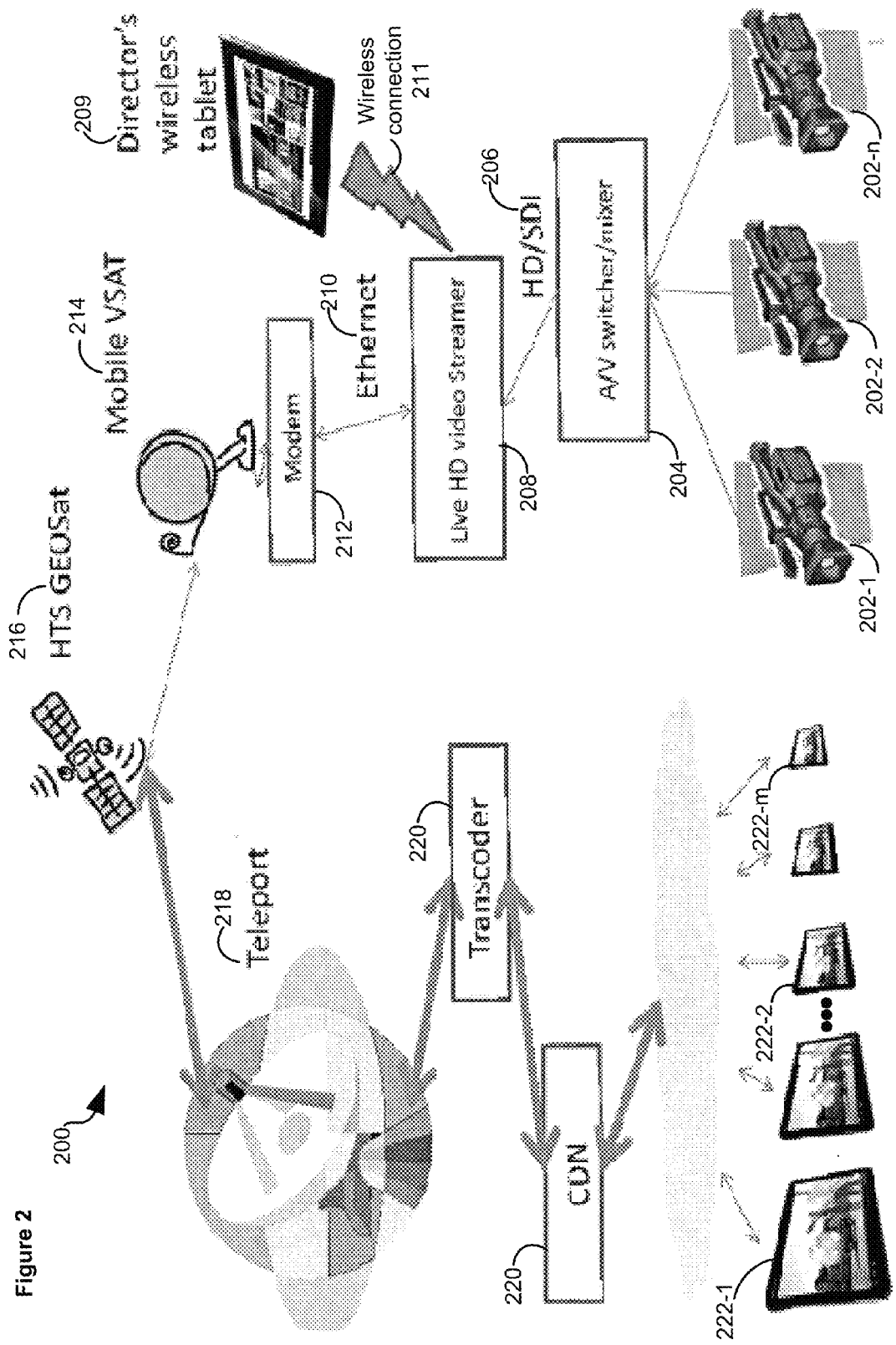
FIG. 2 is a block diagram illustrating an example implementation of a satellite broadcasting system, in accordance with some implementations.

FIG. 2 is a block diagram illustrating an example implementation of a satellite broadcasting system, in accordance with some implementations.

In some implementations, as shown in FIG. 2, audio or video data, from a live event, are collected using one or more (e.g., high definition) camcorders 202-1, 202-2 . . . 202-n (e.g., mobile or stationed at various locations in relation to the live event). In some implementations, the audio or video data are then transmitted to an A/V switcher or mixer 204, using wired (e.g., HDMI cable) or wireless (e.g., wifi) connections so as increase the mobility of the camcorders during the live event, thereby providing a more comprehensive reporting of the live event.

In some implementations, the A/V switcher or mixer 204 transmits the audio or video data to a live HD video/audio streamer 208, as digital signals, via a high definition serial digital interface ("HD-SDI") connection 206, a HDMI connection, or a cable connection. In some implementations, the A/V switcher or mixer 204 includes the amplifier/compressor 112 or the sound mixer 114 (shown in FIG. 1A).

In some implementations, the live HD video/audio streamer 208 produces one or more bitrate streams, using signals received from the A/V switcher or mixer 204, and transmits the bitrate streams to a modem 212, via an Ethernet connection 210. In some implementations, the bitrate streams are produced in accordance with communications (e.g., control signals) received from a control device.

In some implementations, the control device is a mobile computing device (e.g., a tablet) equipped with appropriate software packages and processing power. In some implementations, the control device connects with the live HD video/audio streamer 208 via a wireless connection (e.g., so as to increase mobility of the control device, or a user thereof). In some implementations, a person in charge of broadcasting the live event, such as a broadcasting director, controls the control device (and thus the operation of the live HD video/audio streamer 208) for the duration of the event.

In some implementations, the modem 212 further transmits the digital signals to a mobile VSAT 214. In some implementations, the mobile VSAT 212 is mounted on a vehicle (e.g., a broadcasting vehicle). In some implementations, the mobile VSAT is capable of being folded or collapsed into and transported within a trunk case like container (e.g., to increase the mobility of the VSAT). In some implementations, two or more mobile VSATs are used concurrently, to provide a more comprehensive report of the live event. In some implementations, where several mobile VSATs are used concurrently, one mobile VSAT broadcasts one part of a live event at one location, and another mobile VSAT broadcasts another part of the same event at a different location. For example, one mobile VSAT is used to broadcast, on scene, a roadside traffic accident; while another mobile VSAT is used to broadcast, at a nearby hospital, medical condition of injured occupants.

In some implementations, the mobile VSAT 214 locates a satellite 216, such as a high throughput geo-stationary satellite ("HTS GEOSat" or "GEOSat"), establishes a connection with the GEOSat (e.g., using appropriate credentials), and transmits the digital signals to the GEOSat.

In some implementations, the HTS GEOSat 216 further transmits (e.g., relays) the digital signals to one or more teleports 218 (or hand-held satellite signal receivers) located in different geographical areas. In some implementations, the HTS GEOSat 216 is a satellite whose bandwidth (e.g., transmission speed during a particular time period) or a portion thereof is rented from or owned by DISH NETWORK, HUGHES NETWORK, DIRECTTV NETWORK or TELESAT Canada.

In some implementations, the one or more teleports 216 transmit the digital radio signals to a transcoder 220, which performs one or more digital-to-digital transcoding operations (lossy or lossless) before delivering the transcoded digital signals to a content delivery network ("CDN") 220. In some implementations, the transcoding operations are determined based on one or more performance criteria. For example, when transmission speed is of essence, trancoding operations configured to produce a predefined degree of compression are performed; for another example, when media content quality is of essence, only lossless trancoding operations are performed.

In some implementations, the CDN 220 transmits the digital signals to one or more client devices 222-1, 222-2 . . . , and 222-n (e.g., smart phone, tablets, or smart TV devices), where media content corresponding to the live event is displayed to a user in real time or within a threshold amount of delay (e.g., less than 300 milliseconds) from the occurrence of the live event.

Figure 3:
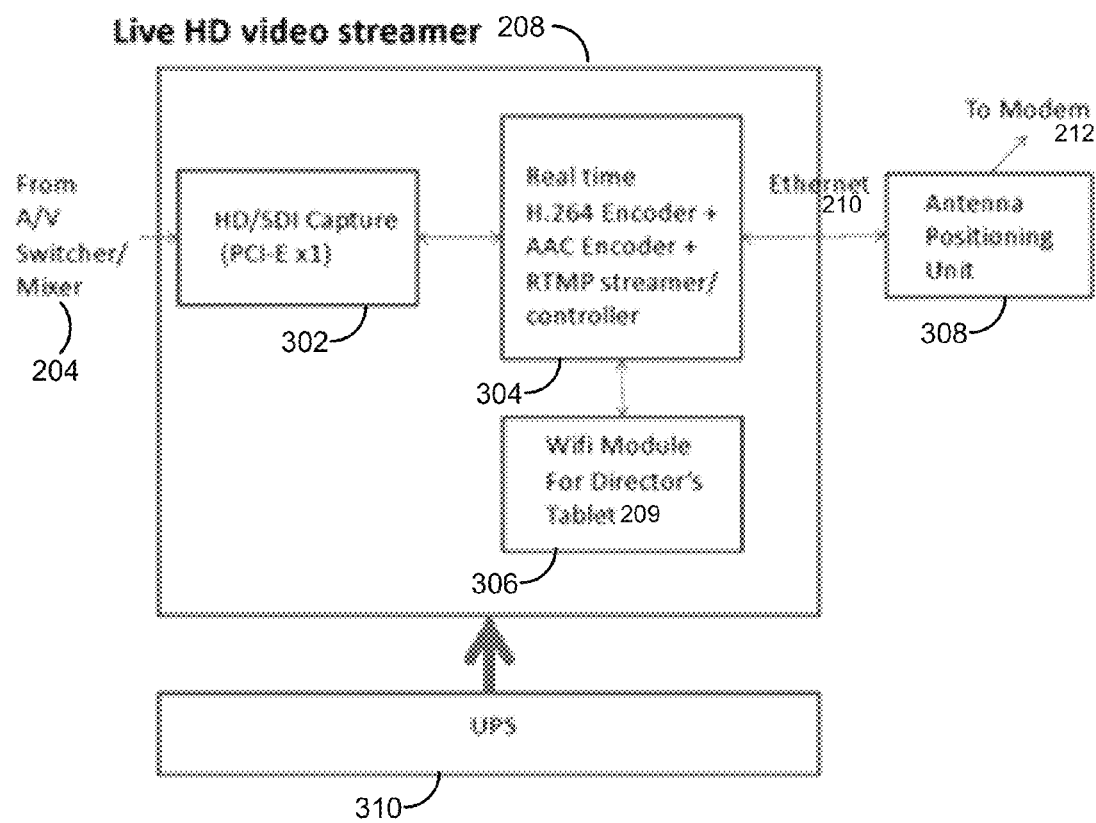
FIG. 3 is a block diagram illustrating an example live HD video streamer, in accordance with some implementations.

FIG. 3 is a block diagram illustrating an example live HD video streamer 208, in accordance with some implementations.

In some implementations, the live HD video stream 208 receives input from the A/V switcher/mixer 204 (as shown in FIG. 1A) and a uninterrupted power supply ("UPS") 310, and outputs digital signals to the Modem 212 or an antenna position unit connected thereto. In some implementations, digital signals received from the A/V switcher/mixer 204 are first processed by a HD-SDI capture unit 302, which is configured to capture a predefined number of HD-SDI link sources simultaneously and support a variety of predefined formats. In some implementations, the HD-SDI capture unit 302 is a PCI-E×1 compatible device.

In some implementations, output from the HD-SDI capture unit 302 is transmitted to a controller 304, which includes a real time H.264 encoder, AAC encoder or an RTMP streamer.

In some implementations, the controller 304 processes the input from the HD-SDI capture unit 302 in accordance with communications (e.g., user input by an event or broadcasting director) received from the UPS 310 (e.g., via a wifi module 209 resident in the streamer 208 and connected with the controller 304).

In some implementations, the signals processed by the controller 304 are transmitted, via the Ethernet 210, to the antenna position unit 308, and then to the modem 212.

In some implementations, the antenna position unit 308 adjusts positions or directions of a satellite uplink device, or a portion thereof (e.g., a satellite dish), so as to locate and connect with a desired satellite, to which digital signals associated with the live event are then transmitted.

Figure 4:
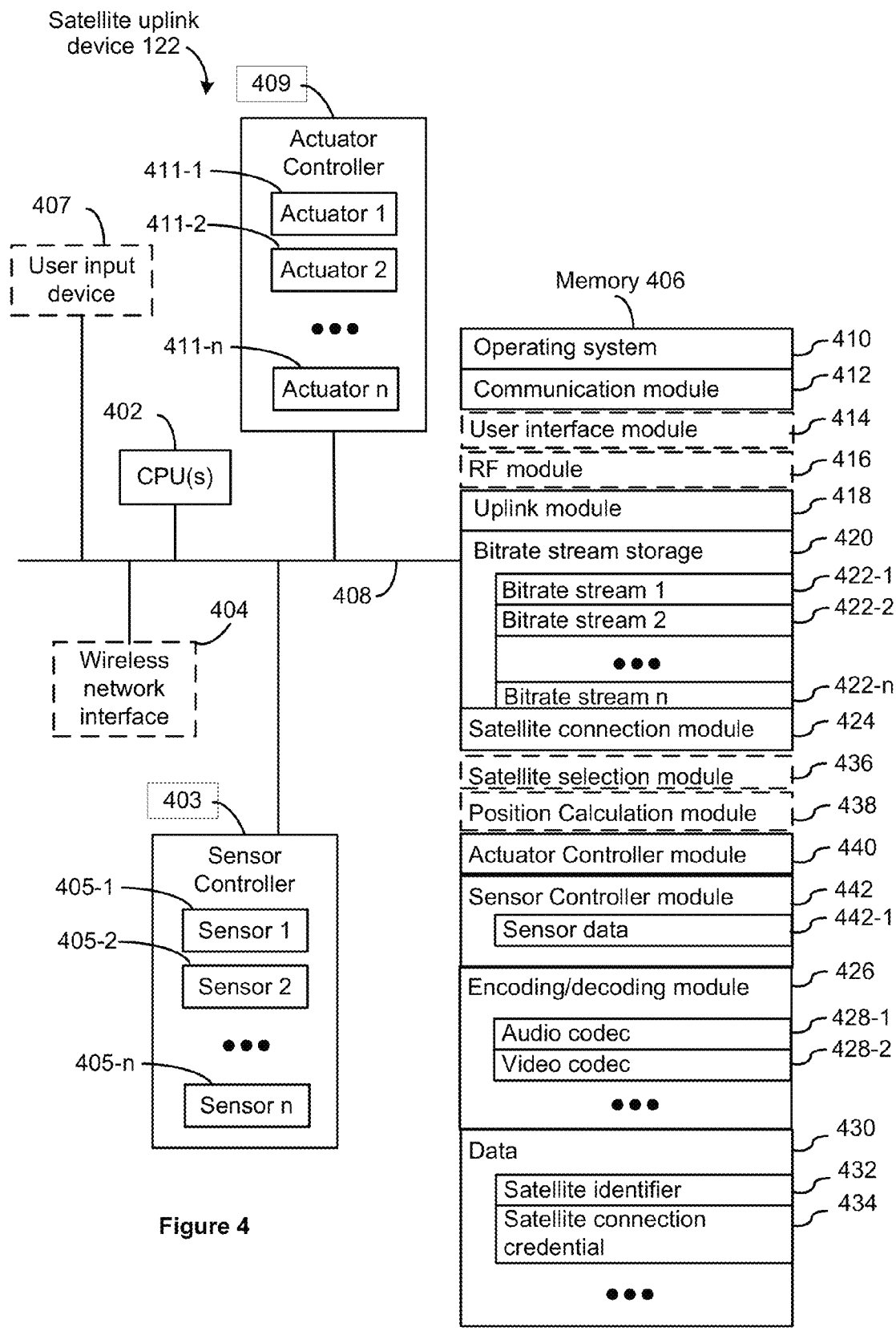
FIG. 4 is a block diagram illustrating a satellite uplink device, in accordance with some implementations.
Figure 10A:
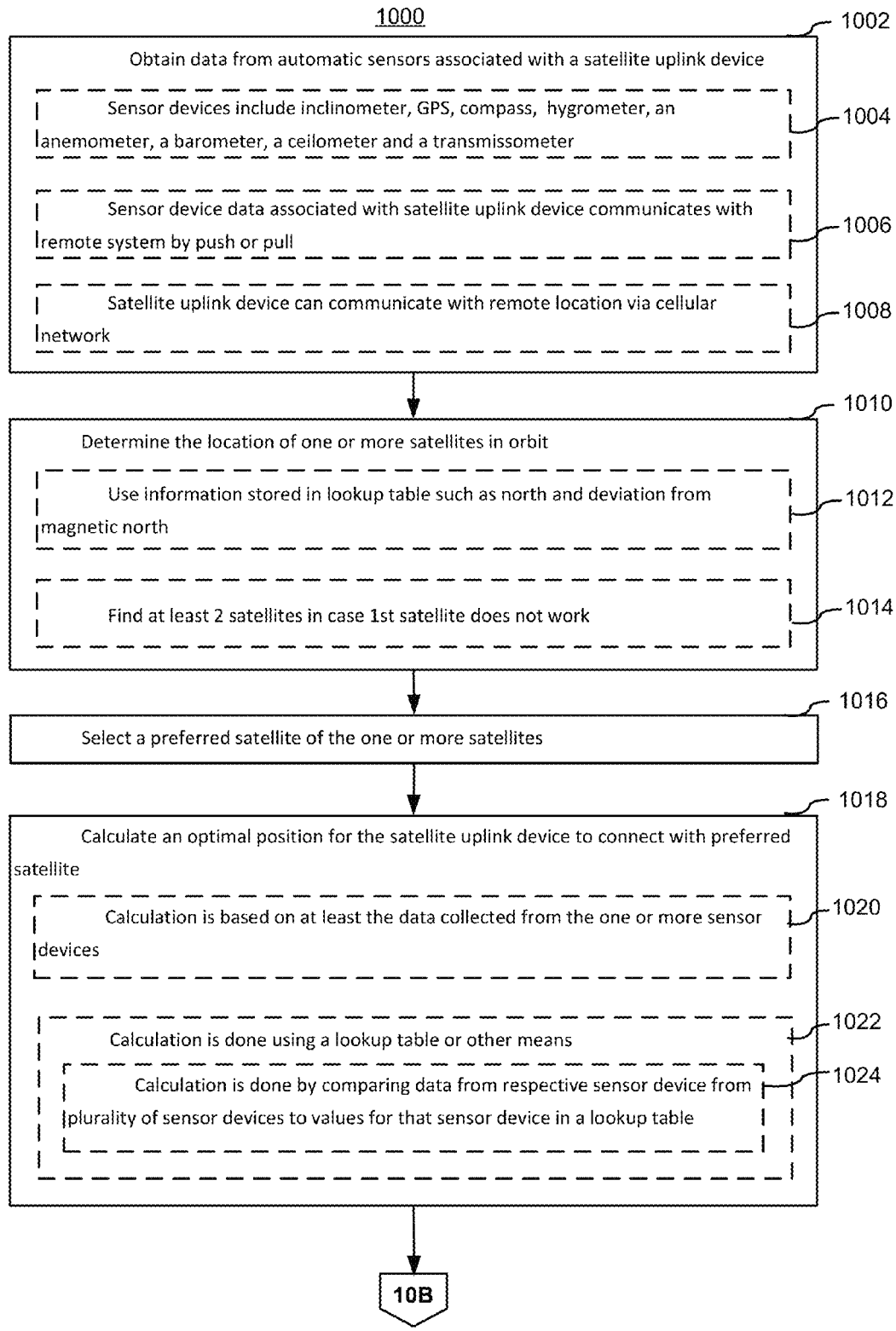
FIGS. 10A-10B are flow charts illustrating a system for positioning a satellite uplink device to distribute an audio or visual feed of a live event, in accordance with some implementations.
Figure 10B:
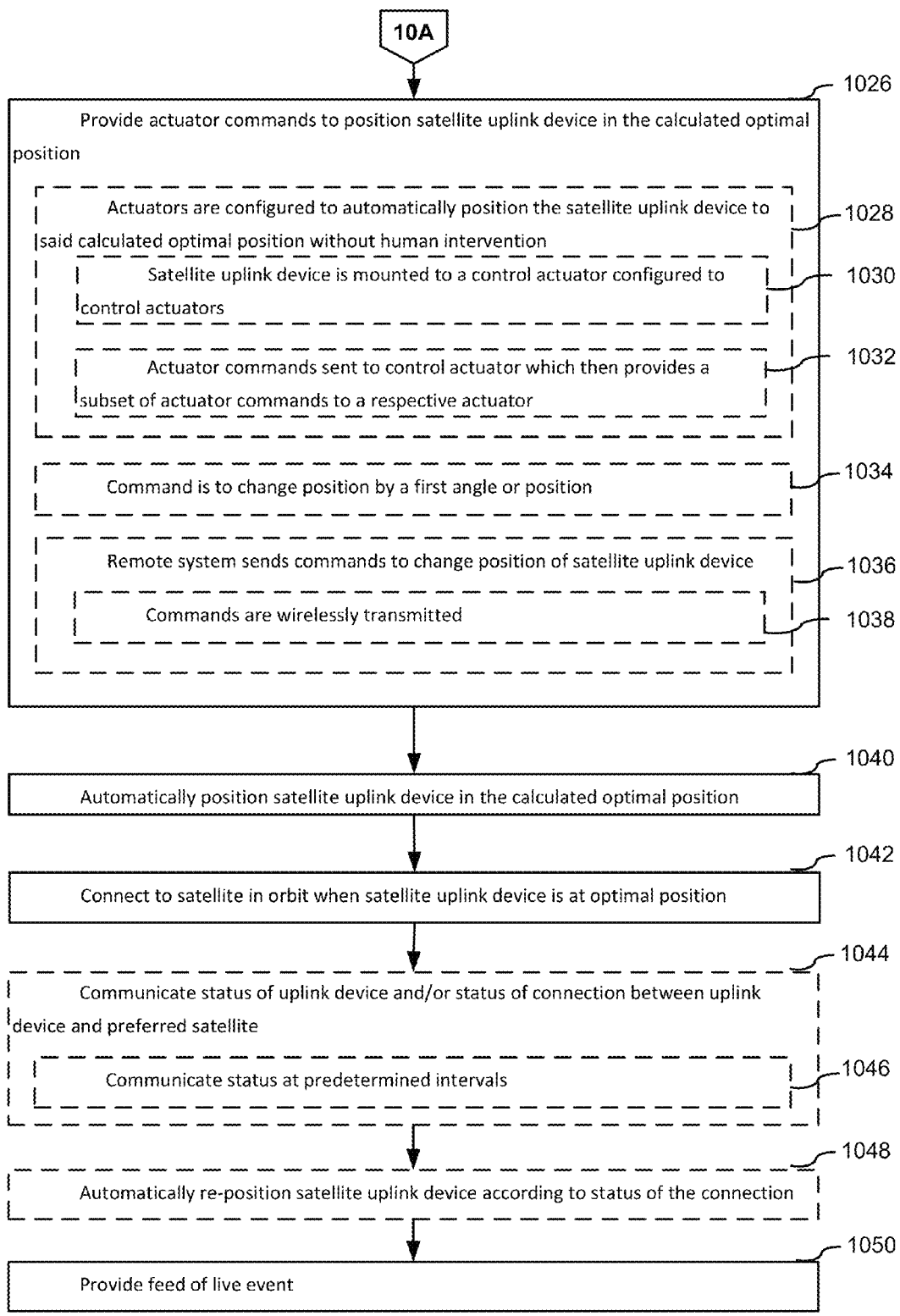

FIG. 4 is a block diagram illustrating a satellite uplink device, in accordance with some implementations. The satellite uplink device 122, in some implementations, includes one or more processing units CPU(s) 402 (also herein referred to as processors), one or more wireless network interfaces 404 for communicating with remote systems such as the remote system 123 (FIGS. 1 and 11) via a wireless communication system such as a cellular network, memory 406, optionally a user input device 407 (e.g., a keyboard, a mouse, a touchpad, or a touchscreen), and one or more communication buses 408 for interconnecting these components. The communication buses 408 optionally include circuitry (sometimes called a chipset) that interconnects and controls communications between system components. An actuator controller 409 for controlling the movement of a plurality of actuators 411-1 to 411-n, each configured to move the satellite uplink device 122 in one or more dimensions. Typically one or more actuators are configured to change one or more orientations of the satellite uplink device. In some implementations, actuators 411-n include motion control systems such as a Stepper Motor, a Linear Step Motor, a DC Brush, Brushless, a Servo, a Brushless Servo and the like. In some preferred implementations, an actuator 411-n is a step motor. A step motor is typically an electromagnetic device that converts digital pulses into mechanical shaft rotation. In most cases the step motor consists of an indexer/controller capable of generating step pulses and directions signals for a driver. The driver/amplifier converts the indexer commands into power to energize the step motor's motor windings. Various different current/amperage ratings of the driver/amplifier are possible depending on the embodiment. In some implementations, the actuator 411-n is a variable reluctance step motor, a permanent magnet step motor, or a hybrid step motor. In some implementations, the actuator 411-n is a unipolar step motor, an R/L step motor, or a bipolar chopper step motor. In some implementations, the control actuator is an electrical actuator or a magnetic actuator. A sensor controller 403 for processing data from one or more sensors associated with the satellite uplink device 122 including sensor 1 405-1, sensor 2 405-2 to sensor n 405-n (e.g., inclinometer, thermometer, barometer, GPS, digital compass as explained in more detail with respect to FIGS. 10A-10B.

Figure 11:
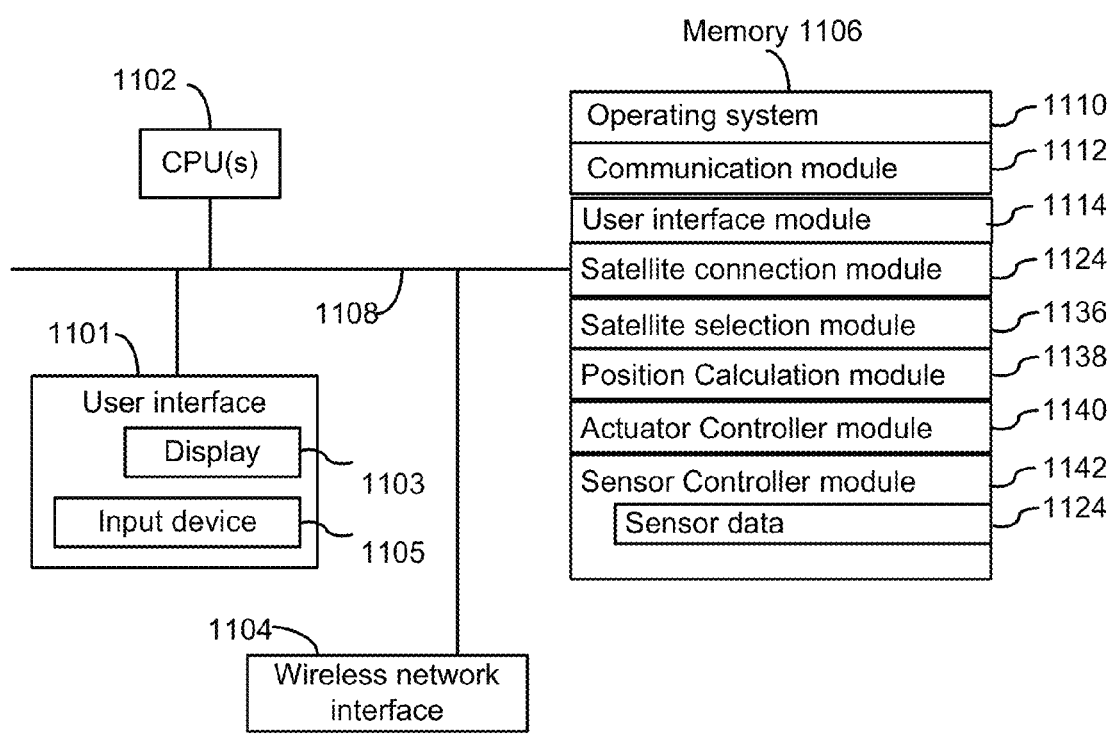
FIG. 11 is a block diagram illustrating a remote device used in selecting a preferred satellite and calculating an optimal position of an satellite uplink device, in accordance with some implementations.

The memory 406 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 406 optionally includes one or more storage devices remotely located from the CPU(s) 402. The memory 406, or alternatively the non-volatile memory device(s) within the memory 406, comprises a non-transitory computer readable storage medium. In some implementations, the memory 406 or alternatively the non-transitory computer readable storage medium stores the following programs, modules and data structures, or a subset thereof:

- an operating system 410, which includes procedures for handling various basic system services and for performing hardware dependent tasks;
- a network communication module (or instructions) 412 for connecting the satellite uplink device 122 with other devices (e.g., the satellite 109 or the RF device 120) via one or more network interfaces 404 (wired or wireless);
- optionally, a user interface module 414 for enabling a user to interact with the satellite uplink device, such as establishing or adjusting a connection between the satellite uplink device and the satellite, e.g., using appropriate login credentials or satellite location information;
- optionally, an RF module 416 for converting incoming signals (e.g., from the streamer 116) into radio frequency signals; in some implementations, the RF module 416, or a portion thereof, is implemented in hardware (e.g., a chip set) to provide more processing power or speed;
- an uplink module 418 for processing and transmitting RF signals to one or more satellite, in accordance with predefined criteria;
- a bitrate stream storage 420, stored on the satellite uplink device 122, which includes:
  - bitrate stream n 422-$n$ for including digital signals awaiting transmission to the satellite;
- a satellite connection module 424 for establishing a new connection or adjusting an existing connection with a satellite (e.g., the satellite 109);
- an optional satellite selection module 436 for processing information (e.g., stored in a lookup table) regarding the satellites present (e.g., the satellite 109) and variables for determining which satellite should be selected as the preferred satellite for connection to the satellite uplink device 122 for the particular live event, where the satellite selection module 436 is optional because in some implementations position selection is performed by a remote system 123;
- an optional position calculation module 438 for calculating the optimal position of the satellite uplink device 122 for connection with the satellite (e.g., the satellite 109), where the position calculation module 438 is optional because in some implementations position calculation is performed by a remote system 123;
- an actuator controller module 440 for receiving movement instruction from a remote system (e.g., remotely located helpdesk) or directly from the position calculation module 438, and converting the instruction into actuator commands;
- a sensor controller module 442 for communicating sensor data 442-1 collected at the satellite uplink device 122 and communicating status of the satellite uplink device sensor data 442-1 may be optionally stored on the satellite uplink device 122 (or it may be stored in a remote system as explained with respect to FIG. 11)
- an encoding/decoding module 426 for encoding or decoding RF signals before they are transmitted to a satellite, using one or more audio/video codecs (e.g., 428-1 and 428-2); and
- data 430, stored on the satellite uplink device 122, which include:
  - a satellite identifier 432, which uniquely identifies the selected satellite from among several available satellite; and
  - satellite connection credential 434, e.g., a connection code, or a user name and corresponding password, for establishing or maintaining a connection with one or more satellites.

In some implementations, the satellite uplink device 122 connects concurrently with two or more satellites. In some implementations, transmission load is balanced among the two or more satellites. In some implementations, the same bitrate streams are sent to several satellites with different target area coverage or performance.

Figure 5:
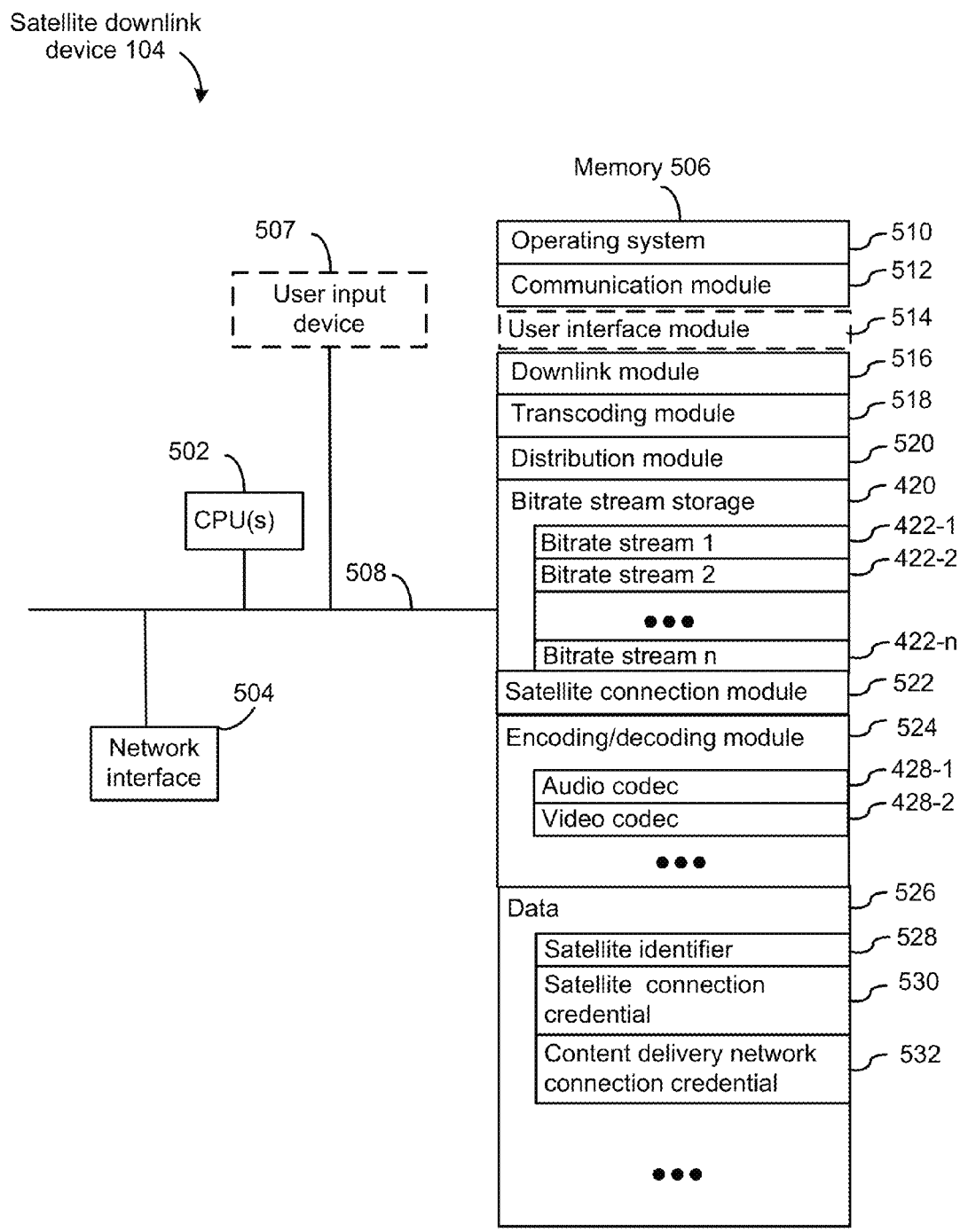
FIG. 5 is a block diagram illustrating a satellite downlink device, in accordance with some implementations.

FIG. 5 is a block diagram illustrating a satellite downlink device, in accordance with some implementations.

The satellite downlink device 104, in some implementations, includes one or more processing units CPU(s) 502 (also herein referred to as processors), one or more network interfaces 504, memory 506, optionally a user input device 507 (e.g., a keyboard, a mouse, a touchpad, or a touchscreen), and one or more communication buses 508 for interconnecting these components. The communication buses 508 optionally include circuitry (sometimes called a chipset) that interconnects and controls communications between system components. The memory 506 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506, or alternatively the non-volatile memory device(s) within the memory 506, comprises a non-transitory computer readable storage medium. In some implementations, the memory 506 or alternatively the non-transitory computer readable storage medium stores the following programs, modules and data structures, or a subset thereof:

- an operating system 510, which includes procedures for handling various basic system services and for performing hardware dependent tasks;
- a network communication module (or instructions) 512 for connecting the satellite downlink device 104 with other devices (e.g., the satellite 109 or the content delivery network 106) via one or more network interfaces 504 (wired or wireless);
- optionally, a user interface module 514 for enabling a user to interact with the satellite downlink device, such as establishing or adjusting a connection between the satellite downlink device 126 and the satellite 109, e.g., using appropriate login credentials, satellite location information;

a downlink module 516 for obtaining incoming signals (e.g., bitrate streams) from a satellite, and processing the incoming signals in accordance with predefined processing criteria;

a transcoding module 518, for applying one or more iterations of transcoding to the incoming signals;

a distribution module 520 for distributing the (optionally transcoded) incoming signals to one or more identified content networks;

a bitrate stream storage 420, stored on the satellite downlink device 104, which include:

bitrate stream n 422-$n$ (or processed signals corresponding thereto), for including digital signals received from a satellite (e.g., the satellite 109);

a satellite connection module 522 for establishing a new connection or adjusting an existing connection with a satellite (e.g., the satellite 109);

an encoding/decoding module 524 for encoding or decoding incoming digital signals (e.g., bitrate streams) before they are transmitted to a content delivery network, using one or more audio/video codecs (e.g., 428-1 and 428-2); and data 526, stored on the satellite downlink device 104, which include:

a satellite identifier 528, which uniquely identifies a satellite among several satellite;

satellite connection credential 530, e.g., a connection code, or a user name and corresponding password, for establishing or maintaining a connection with one or more satellites; and content delivery network connection credential 532, e.g., a connection code, or a user name and corresponding password, for establishing or maintaining a connection with one or more content delivery networks.

Figure 6:
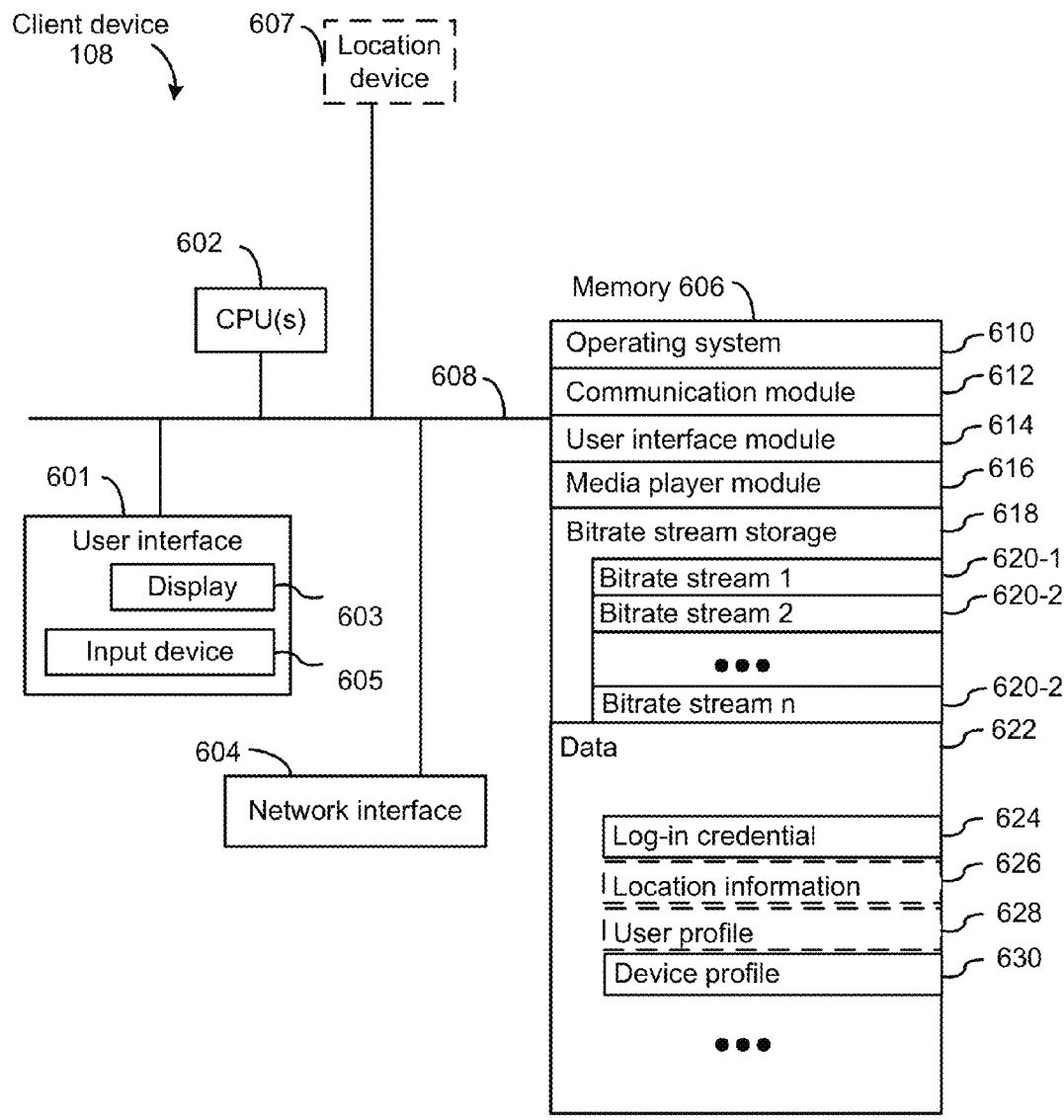
FIG. 6 is a block diagram illustrating a client device, in accordance with some implementations.

FIG. 6 is a block diagram illustrating a client device, in accordance with some implementations. The client device 108, in some implementations, includes a user interface 601, one or more processing units CPU(s) 602 (also herein referred to as processors), one or more network interfaces 604, memory 606, optionally a location device 607 (e.g., a GPS device), and one or more communication buses 608 for interconnecting these components. The user interface 601 includes a display 603 (e.g., a LCD or a touchscreen), and an input device 605 (e.g., a keyboard, a mouse, a touchpad, or a touchscreen). The communication buses 608 optionally include circuitry (sometimes called a chipset) that interconnects and controls communications between system components. The memory 606 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606, or alternatively the non-volatile memory device(s) within the memory 606, comprises a non-transitory computer readable storage medium. In some implementations, the memory 606 or alternatively the non-transitory computer readable storage medium stores the following programs, modules and data structures, or a subset thereof:

an operating system 610, which includes procedures for handling various basic system services and for performing hardware dependent tasks;

a network communication module (or instructions) 612 for connecting the client device 108 with other devices (e.g., the content delivery network 106 or other client devices 102) via one or more network interfaces 604 (wired or wireless);

a user interface module 614 for enabling a user to interact with the client device (e.g., to receive media content from different content delivery networks, or to display or modify the received media content);

a media player module 616 (e.g., MICROSOFT media player or APPLE QUICK TIME) for processing media content (or corresponding signals or bitrate streams) received from content delivery network for user consumption (e.g., visually or audibly);

a bitrate stream storage 618, stored on the client device 108, which includes:

bitrate stream n 620-$n$ (or processed signals corresponding thereto), for including signals received from to the content delivery network; and data 622, stored on the client device 108, which include:

log-in credential 624 for authenticating a user of (e.g., logging into) the client device;

optionally, location information 626 for indicating location of the client device or a user thereof;

optionally, a user profile 628 for including, with express user permission, user demographics (e.g., race, profession, income level, or educational level), or user viewing activity, history, or preference; and a device profile 630 for including client device configuration information (e.g., display resolutions supported or enabled, graphical or general processing power equipped, operating system version, or memory capacity).

In some implementations, the location device 607 identifies, with a predefined level of accuracy, location of the client device 108, which can be used, in many situations, to infer location of a user of the client device (e.g., the user who has an active login on the client device).

Although FIGS. 4 and 5 show a "satellite downlink device 122" and a "satellite uplink device 104," respectively, FIGS. 4 and 5 are intended more as functional description of the various features which may be present in satellite systems than as a structural schematic of the implementations described herein. In practice, and as recognized by those of ordinary skill in the art, items shown separately could be combined and some items could be separated.

In some implementations, one or more of the above identified elements are stored in one or more of the previously mentioned memory devices and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memories 406, 506, 606 optionally store a subset of the modules and data structures identified above. Furthermore, the memories 406, 506, 606 optionally store additional modules and data structures not described above.

Figure 7:
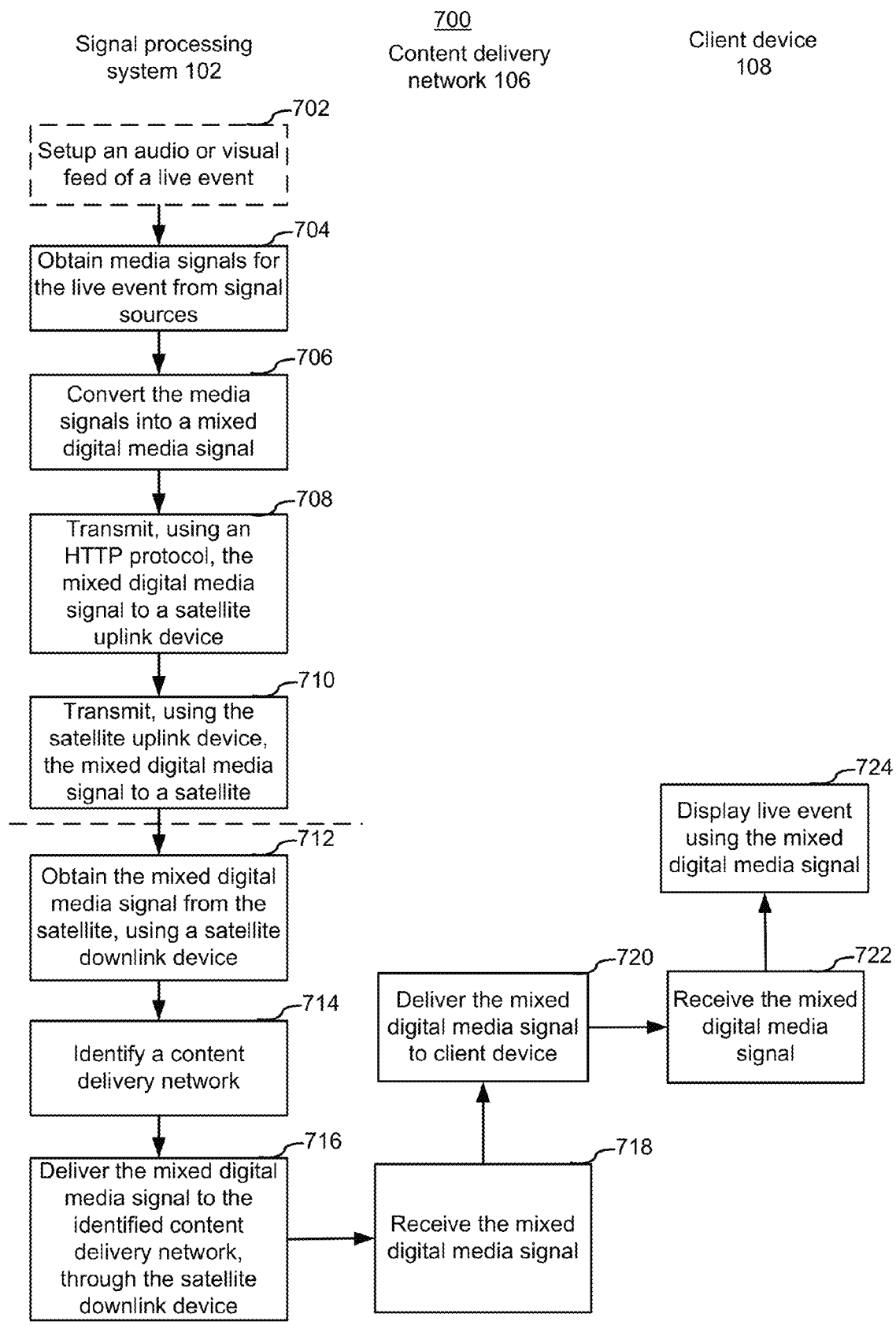
FIG. 7 is a flow chart illustrating a method for distributing audio/video feed of a live event via a satellite, in accordance with some implementations.

FIG. 7 is a flow chart illustrating a method 700, implemented at a computer system, for distributing audio/video feed of live event via satellite, in accordance with some implementations.

In some implementations, an audio or visual feed is optionally first set up at a live event (702), e.g., by positioning one or more microphones or HD cameras at predefined locations relative to the live event. In some implementations, a computer system then obtains (704) media signals for the live event from one or more signal sources (e.g., the microphones or cameras). In some implementations, the media signals are collected as analog signals.

In some implementations, the computer system then converts (706) the (e.g., analog) media signals collected from the signal sources, into a mixed digital media signal, which is then transmitted (708) using a network protocol (e.g., an HTTP protocol) (e.g., through a LAN or an Intranet) to a satellite uplink device. In some implementations, the media signals are mixed using a mixer and then converted, using a streamer (e.g., the streamer 116 in FIG. 1A), into one or more bitrate streams.

In some implementations, the mixed digital media signal is transmitted to the satellite uplink device through a wireless connection (e.g., a wife, Bluetooth, infrared connection). In some implementations, the mixed digital media signal is generated using a device (e.g., the streamer 208) placed in an indoor environment (on a floor, e.g., an elevate floor, of a building, or near a stage), and the satellite uplink device 122 is located on the street near the building, in a parking garage near the building, in a parking lot, alley, or yard near the building, on the roof of a building, a mobile broadcasting vehicle, a large trunk truck, or a trailer truck.

In some implementations, the distance between the streamer 208 and the satellite uplink device is within a predefined threshold distance, so as to maintain signal quality. In some implementations, the distance between the streamer 208 and the satellite uplink device is determined in accordance with capacities associated with the stream or the uplink device. In some implementations, the distance is within 20 meters, 50 meters, 100 meters, 200 meters, or 500 meters.

In some implementations, the wireless connection is implemented in IEEE 802.11 standards, such as 802.11a, 802.11b, 802.11g, 802.11-2007, 802.11n, 802.11n-2012, 802.11ac, and 802.11ad. In some implementations, the wireless connection is implemented in Bluetooth v1.0, v1.0B, v1.1, v1.2, v2.0+EDR, v2.1+EDR, v3.0+HS, or v4.0.

In some implementations, the computer system transmits (710), using one or more satellite uplink devices (e.g., a mobile VSAT), the mixed digital signals at one or more RF frequency bands to a satellite.

In some implementations, the computer system, using one or more satellite downlink devices, such as a teleport or a hand-held satellite signal receiver, obtain s (712) the mixed digital signal from the satellite.

In some implementations, the computer system identifies (714) a content delivery network, among several available content delivery networks, in accordance with one or more predefined criteria. In some implementations, the one or more predefined criteria include one of: performance, bandwidth, quality, pricing, signal coverage, and location.

In some implementations, the computer system delivers (716) the mixed digital media signal (or the bitrate streams) to the identified content delivery network, through the satellite downlink device.

In some implementations, after the mixed digital media signal is delivered, the content delivery network receives (718), and further delivers (720), the mixed media signal, to one or more client devices for user consumption (audibly or visually).

In some implementations, one of the one or more client devices receives (722) the mixed media signal from the content delivery network. In some implementations, media content corresponding to the live event is displayed (720), within a threshold amount of delay (e.g., no more than 75 milliseconds), on the client device. In some implementations, media content is displayed using a predefined resolution (e.g., HD or 1080 p), so as to enhance viewing experience.

In some implementations, a user of a client device optionally executes one or more software applications (such as a TIVO like application), so as to capture or save a copy of the media content for later consumption (e.g., a record and play-later feature).

Figure 8A:
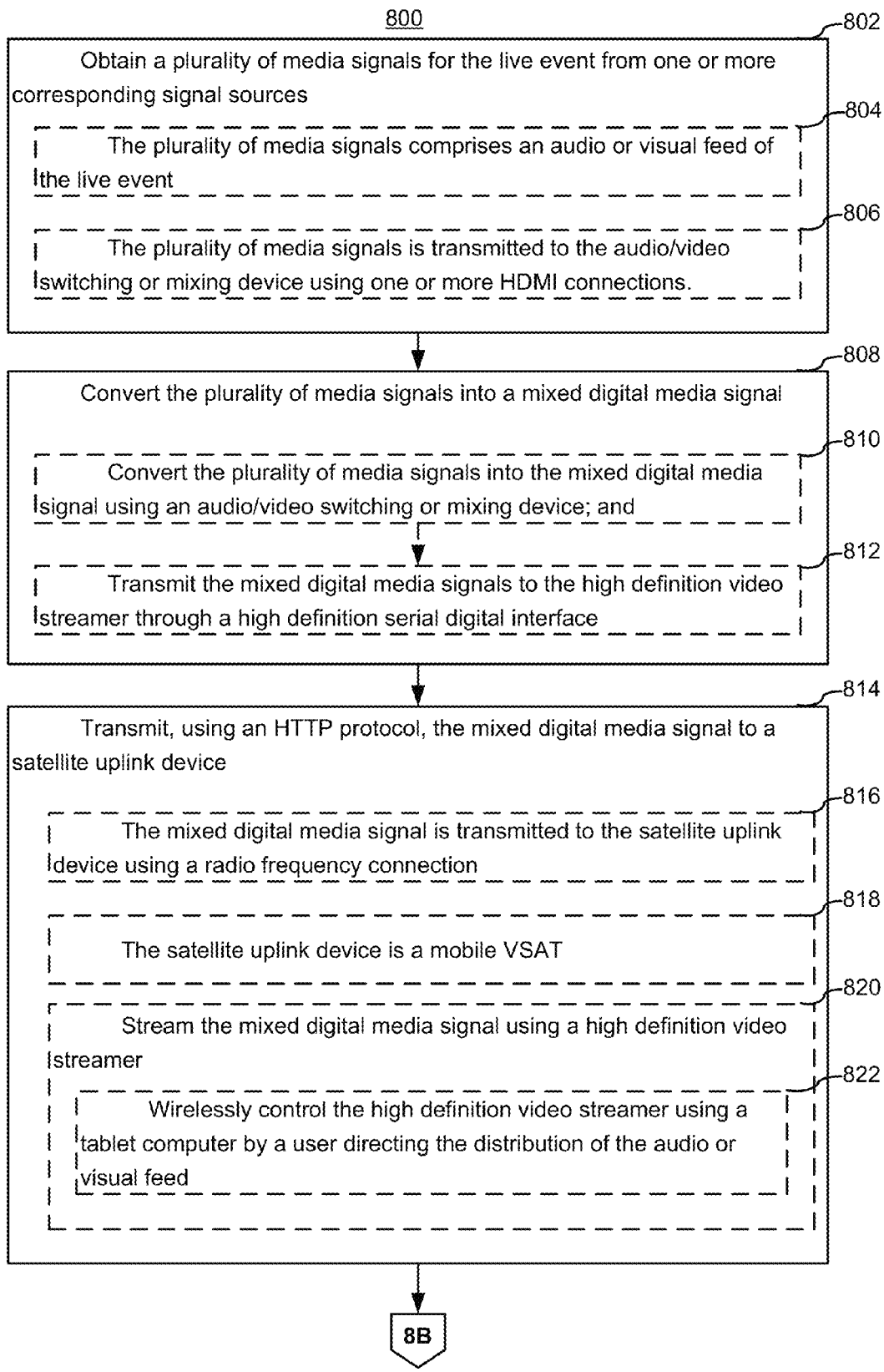
FIGS. 8A-8B are flow charts illustrating methods for distributing audio/video feed of a live event via a satellite, in accordance with some implementations.
Figure 8B:
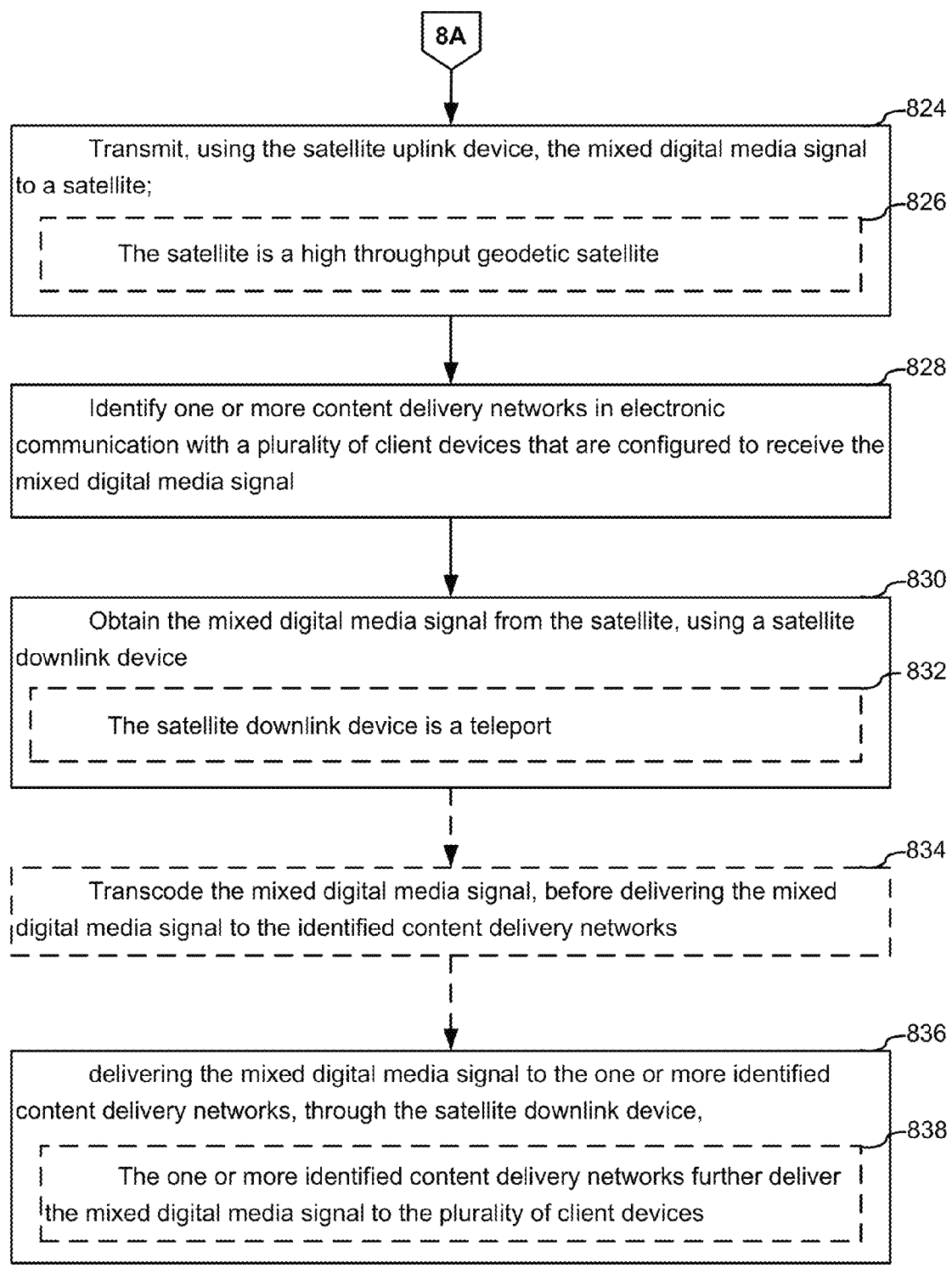

FIGS. 8A-8B are flow charts illustrating a method 800, implemented at a computer system including a satellite uplink device, a satellite, or a satellite downlink device, for distributing audio/video feed of live event via a satellite, in accordance with some implementations.

In some implementations, at a computer system, a plurality of media signals for the live event is obtained (802) from one or more signal sources. In some implementations, a signal source in the one or more signal sources is a HD video camera or a high quality microphone. In some implementations, the plurality of media signals comprises an audio or visual feed of the live event (804). In some implementations, the plurality of media signals includes analog signals collected using microphones, camcorders, or HD cameras, from the live event.

In some implementations, the plurality of media signals is then transmitted to an audio/video switching or mixing device using one or more HDMI connections (806). For example, in some implementations, analog signals collected from microphones or camera are transmitted to the A/V switcher/mixer 104 or the HD video streamer 108 shown in FIG. 2, via one or more HDMI cables, e.g., so as to preserve signal quality.

In some implementations, the plurality of media signals is converted (808) into a mixed digital media signal. In some implementations, the plurality of media signals is first converted (810) into a mixed digital media signal using the sounder mixer 114 or the streamer 116 shown in FIG. 1A, or any analog/digital signal conversion device; the mixed digital media signal is, in turn, transmitted (812) to the high definition video streamer (e.g., the live HD video streamer 208 shown in FIG. 2) through a high definition serial digital interface. Converting analog signals to digital signals is advantageous in many situations (e.g., where preserving signal quality is important). Digital signals are less susceptible to noise or interference than analog signals.

In some implementations, the mixed digital media signal is further transmitted (814), using a network protocol (e.g., an HTTP protocol), to a satellite uplink device. In some implementations, the satellite uplink device is mobile, e.g., mounted on a vehicle or a portable structure or container within predefined height, width, or weight measurements. In some implementations, the satellite uplink device is mobile VSAT (818). In some implementations, the satellite uplink device includes a satellite dish for establish a connection with a satellite.

In some implementations, transmitting, using the HTTP protocol, the mixed digital media signal to the satellite uplink device includes streaming the mixed digital media signal using a high definition video streamer (820), e.g., the streamer 116 in FIG. 1A. In some implementations, the high definition video streamer is controlled (822), via wired or wireless connections, using a portable computer (e.g., an APPLE IPAD or IPHONE or a GOOGLE NEXUS phone or tablet) by a user (e.g., an event director) directing the distribution of the audio or visual feed. In some implementations, wirelessly controlling the streamer is advantageous:

The event director is afforded more mobility while directing a live event, such as a live street performance.

In some implementations, the mixed digital media signal is then transmitted (824), using the satellite uplink device, to a predefined satellite. In some implementations, the satellite is a high throughput geostationary satellite (826), so as to provide high speed connections and thus minimize delays between signal sources at the live event and client devices on which media content are displayed. In some implementations, the mixed digital media signal is transmitted to the satellite using a radio frequency connection (e.g., at predefined frequency) (816).

In some implementations, the mixed digital media signal is obtained (830) from the satellite, using a satellite downlink device. In some implementations, the satellite downlink device is a teleport (832).

In some implementations, the mixed digital media signal is optionally transcoded (834), before being delivered to a content delivery network. In some implementations, the transcoding, a lossy or lossless process, includes a digital-to-digital conversion of signals (e.g., bitrate streams) from encoding format to another (e.g., from MPEG I to MPEG IV). In some implementations, the transcoding includes converting digital signals received from the live event to a format compatible with (e.g., acceptable to) client devices, where media content are displayed to a user. In some implementations, the transcoding process is advantageous, as it allows digital signals to be encoded in a format (e.g., low compression) suitable for transmission by a satellite, and corresponding media content in a different format (e.g., high compression) suitable for delivery to a client device, such as a smart phone, on which storage space is sometimes limited.

In some implementations, one or more content delivery networks in electronic communication with a plurality of client devices are identified (828), where the identified content delivery networks are configured to receive and process the mixed digital media signal.

In some implementations, the mixed digital media signal is then delivered (836) to the one or more identified content delivery networks, through the satellite downlink device.

In some implementations, the one or more identified content delivery networks are configured to deliver (838) the mixed digital media signal to one or more client devices. In some implementations, the content delivery process discussed above is subscription based (e.g., a client device must be an authorized subscriber, in order to receive media content (or the mixed digital media signal) from a content delivery network).

In some implementations, a client device in the plurality of client devices is a tablet computer, a smart phone, a desktop computer, a laptop commuter, a TV, or a portable media player. In some implementations, two client devices in the plurality of client devices are associated with different display resolutions, e.g., a low-resolution cell phone, a medium-resolution tablet computer, and a high-resolution connected TV. In some situations, delivering digital media signals to client devices with different display resolutions is advantageous; as it allows media content to be viewed in a manner best suited a user. For example, a user with high bandwidth (e.g., cable connection) may prefer high-resolution media content; while a user with limited bandwidth (e.g., dial-up connection) may prefer low resolution media content.

Figure 9A:
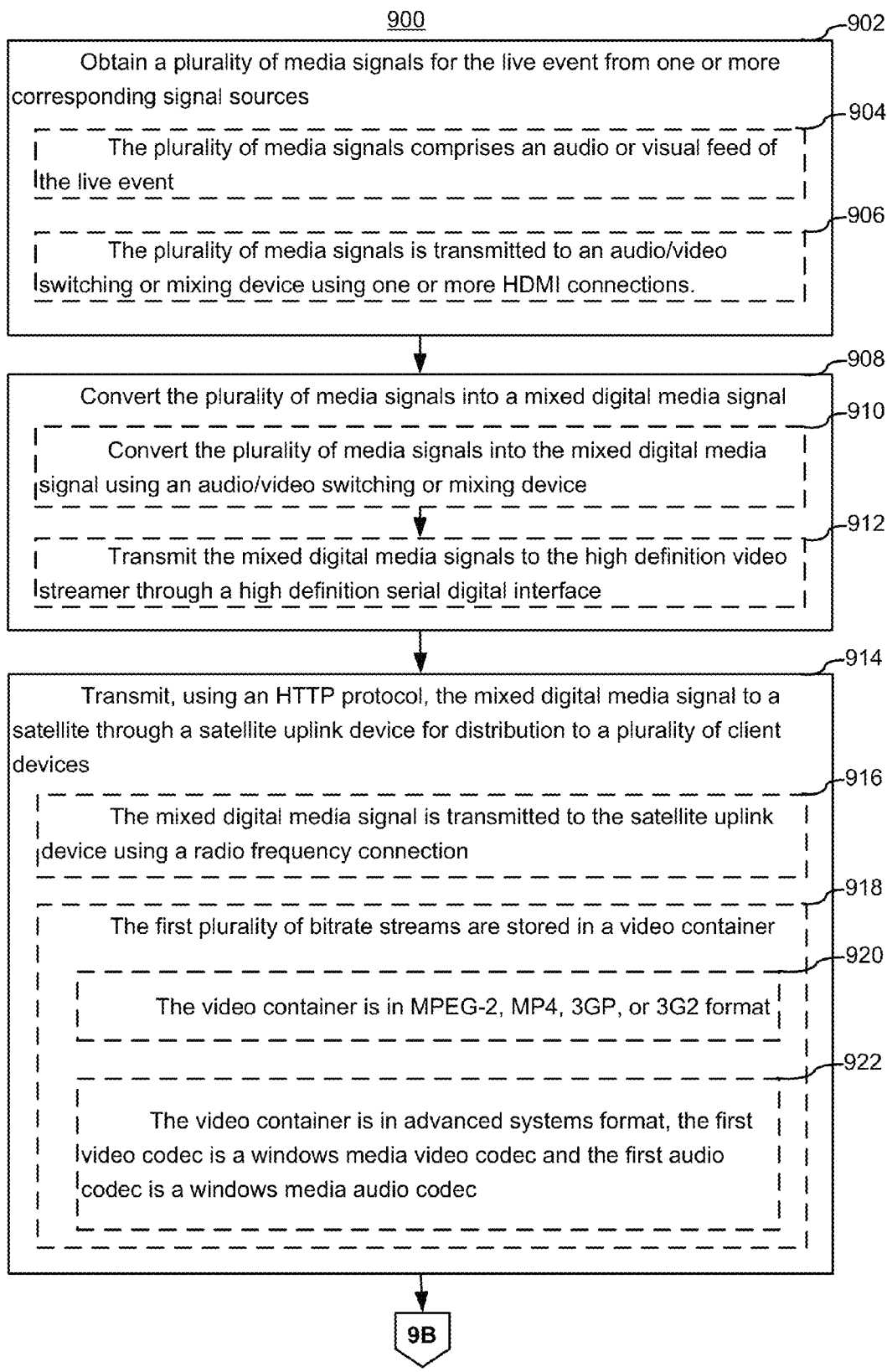
FIGS. 9A-9B are flow charts illustrating methods for distributing audio/video feed of a live event via a satellite, in accordance with some implementations.
Figure 9B:
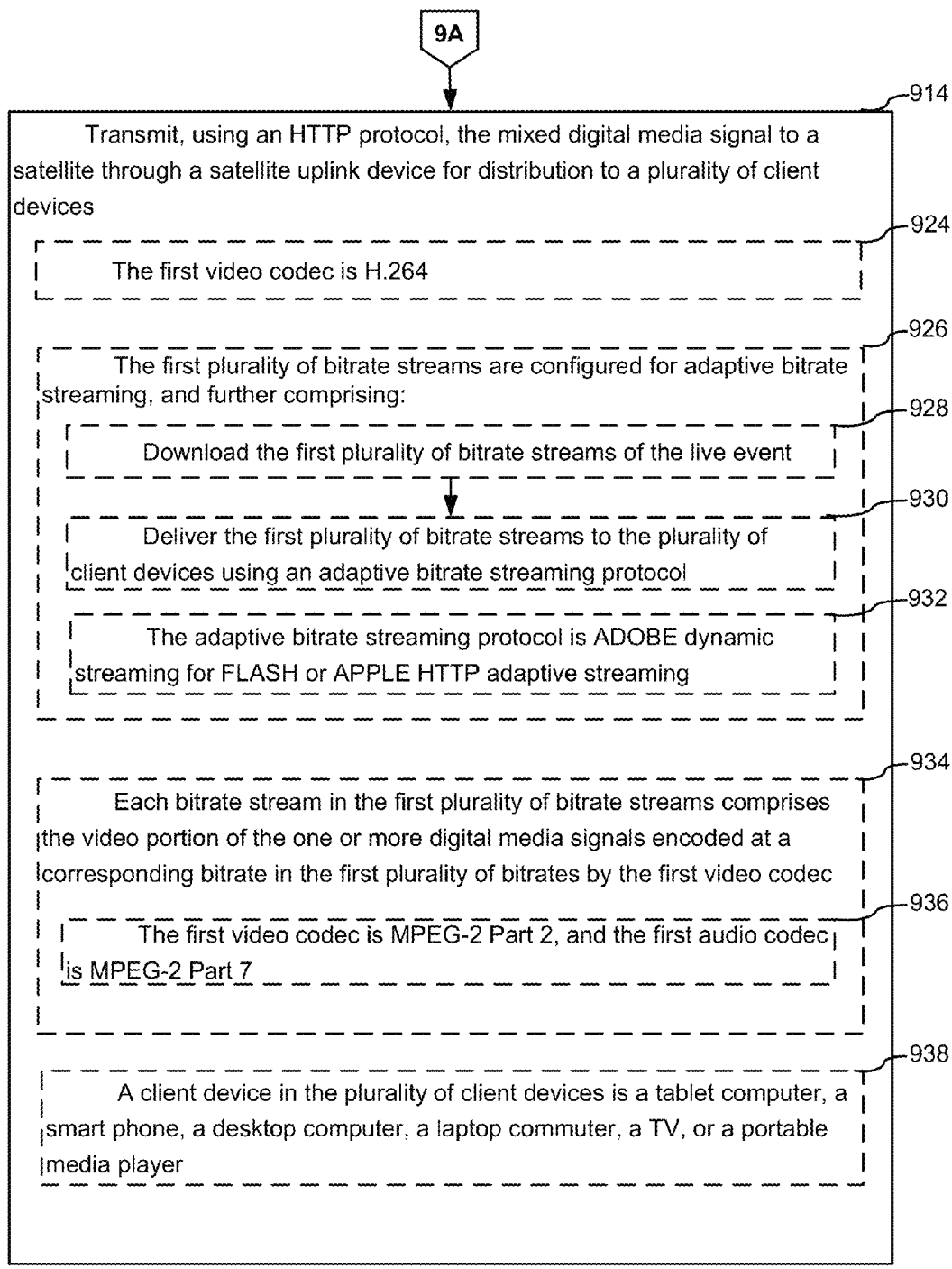

FIGS. 9A-9B are flow charts illustrating a method 900 (e.g., implemented at a computer system) for distributing audio/video feed of a live event via a satellite, in accordance with some implementations.

In some implementations, a plurality of media signals for the live event is obtained (902) from one or more signal sources. In some implementations, the plurality of media signals comprises an audio or visual feed of the live event (904). In some implementations, the one or more signal sources include high quality microphones or HD cameras or camcorders.

In some implementations, the plurality of media signals is transmitted to an audio/video switching or mixing device (e.g., the sound mixer 114 in FIG. 1A) using one or more HDMI connections (906), so as to avoid data loss and to preserve signal quality. For example, in some implementations, analog signals collected from high quality microphones or HD camcorders are transmitted to the audio/video switching or mixing device, via one or more HDMI cables.

In some implementations, the plurality of media signals is converted (908) into a mixed digital media signal. In some implementations, the plurality of media signals is first converted (910) into a mixed digital media signal using the sounder mixer 114, or an A/V conversion device; the mixed digital media signals are then transmitted (912) to a high definition video streamer (e.g., the streamer 116 in FIG. 1A or the live HD video streamer 208 in FIG. 2) through a high definition serial digital interface. Converting analog signals to digital signals is advantageous: Digital signals are less susceptible to noise or interference than analogy signals.

In some implementations, the mixed digital media signal outputted by the high definition video streamer is then transmitted (914), using a network protocol (e.g., an HTTP protocol), through a satellite uplink device (e.g., a mobile VSAT), to a satellite for distribution to a plurality of client devices. In some implementations, the mixed digital media signal is transmitted to the satellite uplink device using a radio frequency connection (916).

In some implementations, the mixed digital media signal is encoded, either before or after the transmission, using (i) a first video codec at each of a plurality of bitrates and (ii) a first audio codec, into a first plurality of bitrate streams.

In some implementations, each bitrate stream in the first plurality of bitrate streams comprises the video portion of the one or more digital media signals encoded at a corresponding bitrate in the first plurality of bitrates by the first video codec.

In some implementations, the first plurality of bitrate streams is stored in a video container (918). In some implementations, the video container is in MPEG-2, MP4, 3GP, or 3G2 format (920). In some implementations, the video container is in advanced systems format, the first video codec is a windows media video codec and the first audio codec is a windows media audio codec (922), e.g., so as to enable the video to be displayed in a MICROSOFT media player. In other implementations, the first video codec is H.264 (924).

In some implementations, the first plurality of bitrate streams is configured for adaptive bitrate streaming (926), and the first plurality of bitrate streams of the live event is downloaded (928); and delivered (930) to a plurality of client devices using an adaptive bitrate streaming protocol.

In some implementations, by using adaptive bitrate streaming protocol, quality of the bitrate streams (e.g., video streams) delivered to a client device is determined or adjusted, in accordance with a client device's bandwidth and processing power (e.g., CPU capacity) in real time). In some implementations, an adaptive encoder is use to encode mixed signals at various bit rates, depending on an amount of resources available at real time at a client device. For example, high quality video streams are delivered to a client device equipped with sufficient processing power and a broadband connection, to take advantage of the amble processing and connection capacity; however, lower quality video streams may be delivered to the same client device, when more than half of the client device's processing and connection capacity is used by other applications or opening threads. In some implementations, the use of adaptive bitrate stream protocol is advantageous, because it may reduce buffering and wait time associated therewith, and maintain quality viewing experience for both high-end and low-end connections. In some implementations, the adaptive bitrate streaming protocol is ADOBE dynamic streaming for FLASH or APPLE HTTP adaptive streaming (932).

In some implementations, each bitrate stream in the first plurality of bitrate streams comprises the video portion of the one or more digital media signals encoded at a corresponding bitrate in the first plurality of bitrates by the first video codec (934). In some implementations, the first video codec is H.264, and the first audio codec is ACC (938).

In some implementations, a client device in the plurality of client devices is a tablet computer, a smart phone, a desktop computer, a laptop commuter, a TV, or a portable media player (940).

Figure 1B:
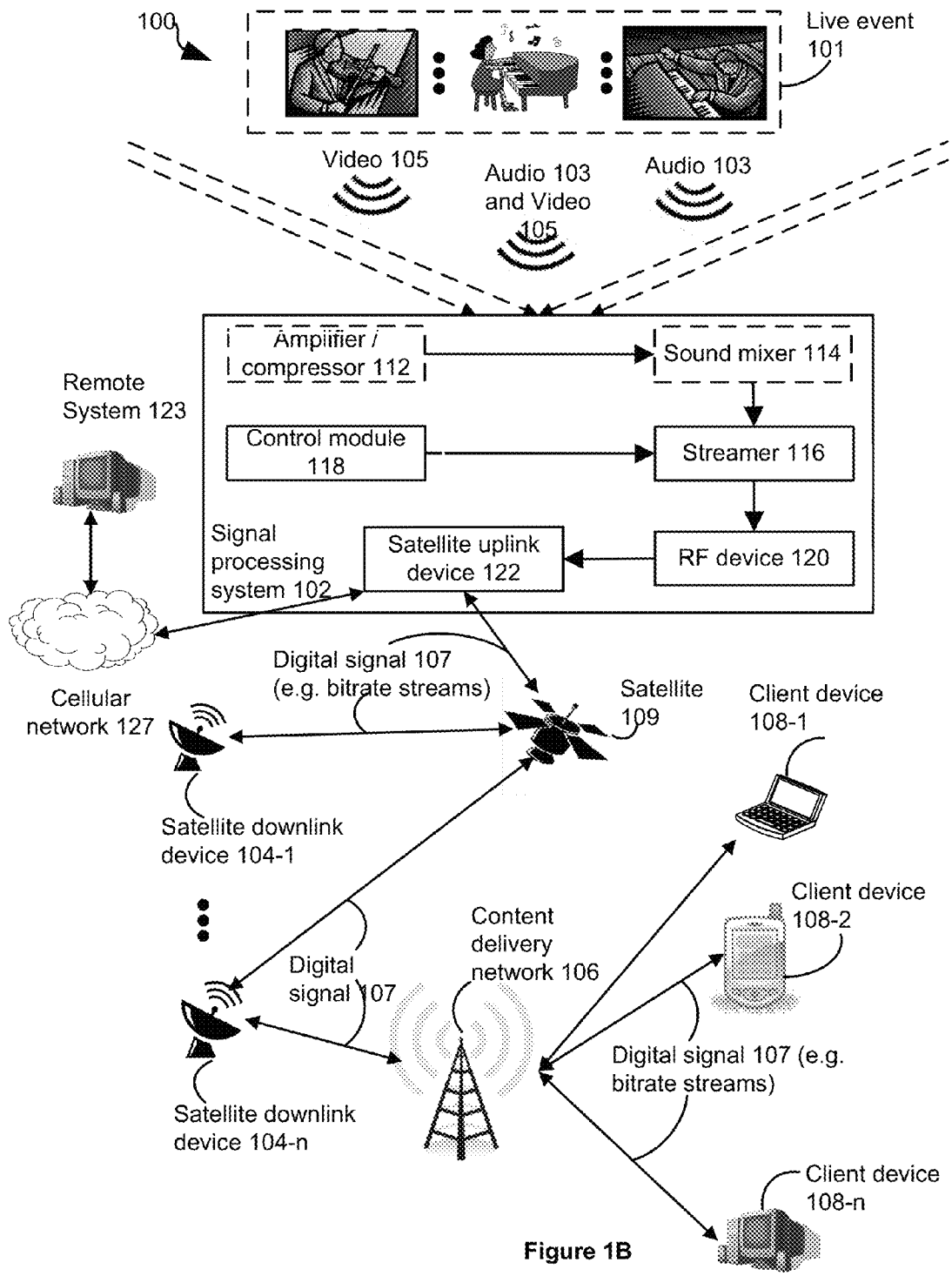
FIG. 1B is a block diagram illustrating a system for positioning a satellite uplink device to distribute an audio or visual feed of a live event, in accordance with some implementations.

FIG. 1B illustrates essentially what is described above with respect to FIG. 1A except that it additionally illustrates that in some implementations, the satellite uplink device 122 is connected to a remote system 123 via a cellular network 127. As illustrated in FIG. 4, the satellite uplink device 122 is associated with one or more sensor devices 405-1 to 405-n. The optimal position of the satellite uplink device 122 for connecting with the satellite 109 is calculated based on at least the data collected from the sensor devices 405-1 to 405-n. In some implementations, a remote system 123 (e.g. a remotely located helpdesk or a user device such as the iPad of the live event's technician) can also instruct the satellite uplink device to change its position. In some implementations, the remote system 123 includes a user device such as, is an iPad, cell phone with video display, laptop computer, or a similar device. The satellite uplink device 122 communicates with the remote system via a cellular network 127. A user such as a helpdesk operator, is thus capable of accessing the data collected by the sensor devices (e.g. camera view at the satellite uplink device) and provide commands to actuators associated with the satellite uplink device 411-1 to 411-n to change the orientation of the satellite uplink device 122 so as to facilitate connecting to the satellite 109.

FIG. 10 is a flowchart representing a method (1000) for controlling a satellite uplink device to be positioned to distribute an audio or visual feed of a live event, according to certain implementations. The method (1000) is typically governed by instructions that are stored in a computer readable storage medium and that are executed by one or more processors of one or more computers. Each of the operations shown in FIG. 10 typically corresponds to instructions stored in a computer memory or non-transitory computer readable storage medium. The computer readable storage medium typically includes a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors. Specifically many of the operations shown in FIG. 10 correspond to instructions in the satellite uplink device 122 or the remote system 123 as shown in FIGS. 4 and 13 respectively. The method 1000 described below can be carried out in its entirety on the satellite uplink device 122. However, portions of the method may be carried out on a remote system such as storing the positions of satellites in orbit, storing sensor device data and calculating the satellite uplink device optimal position. Performing these steps on a remote system is advantageous because a remote system is likely to have more computing power, and may have the ability to update satellite position data and other data easily and efficiently.

In one aspect of the present disclosure, a method (1000) for controlling a satellite uplink device to be positioned to distribute an audio or visual feed of a live event proceeds as follows. In some implementations, the satellite uplink device is associated with one or more sensor devices from which the satellite uplink device, having one or more processors and memory storing one or more instructions for execution by one or more processors, obtains data 1002. In some implementations, the satellite uplink device is associated with one or more sensor devices from which the remote system, having one or more processors and memory storing one or more instructions for execution by one or more processors, obtains data 1002. A respective sensor device of the plurality of sensor devices is a positioning device selected from the group consisting of: a camera—captures images around the satellite uplink device, an inclinometer—a sensor that measures the tilt angle of the satellite uplink device, a digital compass—a sensor that measures where magnetic north is in relation to the satellite uplink device, or a Global Positioning System (GPS)—to measure the absolute coordinates of where the satellite uplink device is located and the date and time 1004. A respective sensor device of the plurality of sensor devices is a field condition device selected from the group consisting of a thermometer, a hygrometer, an anemometer, a barometer, a ceilometer and a transmissometer 1004. The field condition sensors can be used to compensate for errors in the readings of the positioning devices and to verify that the satellite uplink device was set up correctly. For example, the camera could be used to verify the sky view of the satellite uplink device is unobstructed.

In some implementations, the data collected from the sensor devices associated with the satellite uplink device is received by the remote system either by a push or pull mechanism 1006. For example, the data collected by the sensor devices can be routed to servers at a help desk related to the system and calculations regarding the satellite uplink device may occur at this remote location's servers. In some implementations, the satellite uplink device communicates with this remote system via a cellular network 1008. The data associated with the satellite uplink device includes the current status of the satellite uplink device's GPS location, its altitude, the current weather conditions where the satellite uplink device is located (e.g. humidity, temperature, wind) and the line of sight of the satellite uplink device.

In some implementations, the location of one or more satellites in orbit is 1010 determined by either the satellite uplink device or the remote system. Information stored in a look up table including information that defines magnetic north and deviation from real north based on the date and time, as well as information related to the position of satellites in orbit are used to determine the location of one or more satellites in orbit 1012. In some implementations, at least two satellites are found so that a second satellite can be used if the first satellite found does not connect to the satellite uplink device 1014.

A preferred satellite is chosen from the one or more satellites found 1016. The preferred satellite may be the closest satellite, a satellite which appears to have the capacity to receive live event data, or other factors which make it preferred. In some implementations the satellite uplink device 122 performs the selection. In other implementations the remote system 123 performs the selection.

In some implementations, an optimal position of the satellite uplink device is calculated to connect with the preferred satellite in orbit 1018. These calculations are performed by either the satellite uplink device or the remote system and are based at least on data collected from the one or more sensor devices 1020. In some implementations, calculations are performed using a lookup table or other means 1022. In some implementations, the optimal position is calculated by comparing data from a respective sensor device of the plurality of sensor devices to values for the respective sensor device in a lookup table 1024.

Actuator commands are provided to position the satellite uplink device in the calculated optimal position 1026. In some implementations, the remote system 123 provides actuator commands to position the satellite uplink device as instructions over a wireless connection to the satellite uplink device. In other implementations, when the satellite uplink device performs the calculations of 1018 locally, it provides the actuator commands to an actuator controller 409. In some implementations, positioning the satellite uplink device includes the satellite uplink device determining actuator commands to position the satellite uplink device in the calculated optimal position and providing actuator commands to one or more actuators connected to the satellite uplink device. The one or more actuators are configured to position the satellite uplink device to said calculated optimal position in accordance with the actuator commands without human intervention 1028. In some implementations, the satellite uplink device is mounted to a control actuator 1030. Actuator commands are sent to the control actuator which then selectively provides a subset of actuator commands to a respective actuator of the one or more actuators 1032. In some implementations, the actuator is one or more of, or a combination of: a linear actuator, a step motor, a servo motor and a geared motor. An actuator command may include at least a command to change the orientation by a first angle in the plurality of angles in the vertical plane, at least a command to change the orientation by a first angle in the plurality of angles in the horizontal plane, at least a command to change position by a first distance in the plurality of distances in the vertical plane, at least a command to change position by a first distance in the plurality of distances in the horizontal plane, and at least a command to change position by a first distance in the plurality of distances forward or backward relative to the starting position of the satellite uplink device 1034.

In some implementations, the remote system automatically or by means of user intervention (e.g. helpdesk at a remote location), sends instructions to change the orientation of the satellite uplink device 1036. In some implementations, the user's instructions are packetized prior to wireless transmitting 1038. In some implementations, the actuator commands are transmitted using an 802.11 protocol to a user. In some implementations, the user's instructions are encoded and packaged as Short Message Service (SMS) messages and wirelessly transmitted using a cellular network to the satellite uplink device for changing the orientation of the satellite uplink device. In some implementations, the cellular network is a 2G, 3G or 4G cellular network. Then the satellite uplink device's control actuator orients the satellite uplink device in accordance with the commands. It is noted that in some implementations, the same wireless transmissions are also used by the satellite uplink device to communicate sensor data to the remote system at step 1002. In some implementations, the remote system includes a cellular phone, preferably a smart phone, and in some implementations, the cellular phone captures communication from a user directing the satellite uplink device to be repositioned. The communication from the user includes one or more of: a user finger swipe action, a user selection of a direction on a touch screen and a user typed string of direction information.

In some implementations, the satellite uplink device is then automatically positioned in the calculated optimal position 1040. The positioning is performed by means of the actuators carrying out the instructions provided to them.

Once the satellite uplink device is at the optimal position, a connection between the satellite uplink device and the preferred satellite is then established 1042.

In some implementations, the status of the uplink device is communicated to a remote system 1044. In some implementations, the status of the satellite uplink device is communicated to the remote system at predetermined intervals 1046. For example, the satellite uplink device can communicate its status to a helpdesk at a remote location. If the uplink device is over turned or on fire, the satellite uplink device can communicate its status to the remote system and may allow the remote system to access data from sensor devices associated with the satellite uplink device, such as camera images, thus aiding the helpdesk operators with determining how to solve any problems occurring at the satellite uplink device. In some implementations, the status of the connection between the satellite uplink device and the preferred satellite is communicated to a remote system 1044 and in some implementations, the status of the connection between the satellite uplink device and the preferred satellite is communicated to a remote system at predetermined intervals after the connection with the preferred satellite is established 1046. Again, data from the sensor devices associated with the satellite uplink device will provide information regarding what may be causing a disruption in the connection between the satellite uplink device and the satellite in orbit, and provide information on how that problem should be solved.

In some implementations, the satellite uplink device is automatically re-positioned from the optimal position to a second position according to the status of the connection between the satellite uplink device and the preferred satellite 1048. In some implementations, the satellite uplink device is automatically re-positioned when the status of the connection between the satellite uplink device and the preferred satellite is below a preferred status rating associated with the preferred satellite in a lookup table.

In some implementations, an audio or visual feed of a live event is provided from the satellite uplink device to the preferred satellite 1050.

As such, in accordance with the above described method, a satellite uplink device can be remotely controlled and positioned to connect with a preferred satellite in orbit. Also, a remote system such as that associated with a remotely located helpdesk, can communicate with the satellite uplink device to gather information about the position of the satellite uplink device (its location, what is in the line of sight of the satellite uplink device), and the field conditions (e.g. humidity, temperature or cloud cover) surrounding the satellite uplink device. The satellite uplink device can be automatically repositioned based on changes in its connection to the preferred satellite or it can be sent commands to reposition itself from a remote system. Thus, an event organizer need not have the technical background or knowledge on staff to connect to a satellite to broadcast a live event. Also, an event organizer or those supporting the broadcasting of a live event, need not be physically present at the satellite uplink device to ensure that it is working properly—from connecting to the satellite for broadcasting to repositioning the satellite uplink device when there is a reason to do so.

FIG. 11 is a block diagram illustrating an optional remote system 123, in accordance with some implementations. The remote system 123, is used in some implementations, to control the calculation heavy portions of the above described method such that the satellite uplink device can be a simpler and cheaper device which relies on the remote system for instructions and actuator commands. The remote system 123 also is capable of obtaining information other than that provided by the satellite uplink device's sensors to augment its calculations. Furthermore, the remote system 123 is also capable of communicating with external sources to obtain up to date information regarding the positions of available satellites. Additionally, in some situations a user can manually control the remote system to perform manual instructions for the satellite uplink device. This is useful for example in set up and maintenance functions. The remote system 123 includes one or more processing units CPU(s) 1102 (also herein referred to as processors), one or more wireless network interfaces 1104 for communicating with the satellite uplink device via a wireless communication system such as a cellular network, memory 1106, a user interface 1101 including a display 1103 and an input device 1105 (e.g., a keyboard, a mouse, a touchpad, or a touch screen), and one or more communication buses 1108 for interconnecting these components. The communication buses 1108 optionally include circuitry (sometimes called a chipset) that interconnects and controls communications between system components. The memory 1106 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 1106 optionally includes one or more storage devices remotely located from the CPU(s) 1102. The memory 1106, or alternatively the non-volatile memory device(s) within the memory 1106, comprises a non-transitory computer readable storage medium. In some implementations, the memory 1106 or alternatively the non-transitory computer readable storage medium stores the following programs, modules and data structures, or a subset thereof:

- an operating system 1110, which includes procedures for handling various basic system services and for performing hardware dependent tasks;
- a network communication module (or instructions) 1112 for connecting the remote system 123 with other devices (e.g., the satellite uplink device via one or more network interfaces 1104 (wired or wireless); remote system, such as establishing or adjusting a connection between the satellite uplink device and the satellite, e.g., using appropriate login credentials or satellite location information;
- a satellite connection module 1124 for establishing a new connection or adjusting an existing connection with a satellite (e.g., the satellite 109);
- a satellite selection module 1136 for processing information (e.g., stored in a lookup table) regarding the satellites present (e.g., the satellite 109) and variables for determining which satellite should be selected as the preferred satellite for connection to the satellite uplink device 122 for the particular live event;
- a position calculation module 1138 for calculating the optimal position of the satellite uplink device 122 for connection with the satellite (e.g., the satellite 109);
- an actuator controller module 1140 for providing actuator command to position the satellite uplink device in the calculated optional position;
- a sensor controller module 1142 for receiving sensor data 442-1 collected at the satellite uplink device 122 and optionally storing the sensor data 442-1.

Satellite Auto-Acquire.

In some implementations, technical features for automatically acquiring a connection with a satellite are also provided.

Figure 12:
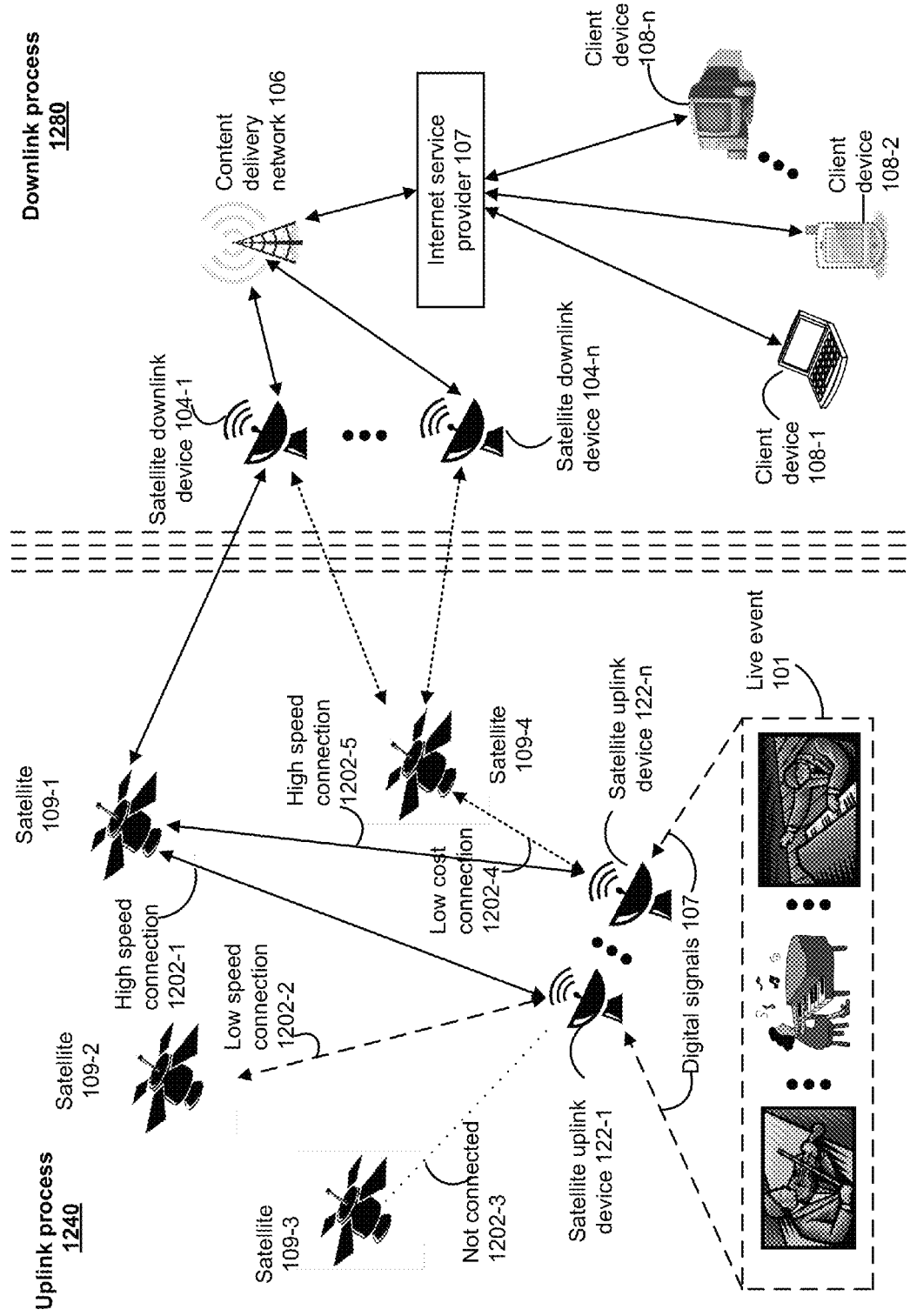
FIG. 12 is a block diagram illustrating a system for distributing audio/video feed of live event via a satellite and satellite auto-acquire, in accordance with some implementations.

FIG. 12 is a block diagram illustrating a system for distributing audio/video feed of live event via a satellite and satellite position auto-acquire, in accordance with some implementations.

In some implementations, analog (e.g., audio and video) signals collected from the live event 101 are first transformed into mixed digital signals 107 (which are less susceptible to electronic interferences). In some implementations, the digital signals 107 are transmitted to one or more satellite uplink devices (122-1 . . . 122-n).

During the uplink process 1240, the satellite uplink device 122-1 automatically acquires (e.g., establishes, and sometimes also call "auto-acquire") a connection with the satellites 109-1 and 109-2 (a high speed connection 1202-1 and a low speed connection 1202-2, respectively), but not with the satellite 109-3 (e.g, not connected 1202-3).

Similarly, during the uplink process 1240, the satellite uplink device 122-n automatically acquires a connection with the satellites 109-1 and 109-4 (a high speed connection 1202-1 and a low cost connection 1202-4, respectively).

In some implementations, during an auto-acquire processes, a satellite uplink device identifies two or more different satellites, and establish a connection with one satellite but not others, based on connection/selection criteria, examples of which are set forth in more detail below.

It is noted that, in some implementations, an auto-acquire process does not require a user to specify which satellite should be connected to an uplink device. For example, in some implementations, a user is not required to "find" a satellite for an uplink device, by ways such as mechanically pointing or repointing an uplink device to a satellite, or entering satellite coordinates. Instead, in some implementations, a user only needs to push a "Connect" button, in order to establish a satellite connection. In some implementations, after detecting a user communication requesting a satellite connection, an uplink device automatically, e.g., using information stored in a lookup table, selected one or more satellites among several different available satellites for connection.

During the downlink process 1280, the digital signals 107 are downloaded to one or more downlink devices 104-1 . . . 104-n, and further delivered to one or more content delivery networks 106. Next, the digital signals 107 are delivered to several Internet service providers 107, which in turn deliver the digital signals to one or more client devices 108.

In some implementations, the above-described methods further include: selecting, automatically without human intervention, the satellite from a plurality of satellites for transmitting the mixed digital media signal. For example, in order to transmit the mixed digital signals using a satellite, the broadcasting system first establishes a satellite connection (e.g., a data transmission connection with a satellite). In some cases, the satellite is automatically selected (e.g., chosen) from a set of different satellites without requiring any user input. For example, a user need not specify which satellite to connect with, because a satellite is automatically selected and a connection thereto established based on one or more selection criteria, such as satellite availability, transmission speed, or pricing information.

Automatically acquiring a connection with a satellite is technically advantageous for at least the following reasons. First, it eliminates or reduces the need to have an onsite trained technician to setup and to maintain a satellite connection (e.g., setting up uplink devices, commissioning a mobile terminal, and switching to a new satellite in case of an outage). This is even more advantageous for broadcasting live events being held at remote locations, e.g., a rock concert held inside the Yellowstone National Park or a car race in the Dubai deserts. For instance, the cost to send a trained technician to install and maintain a VSAT can be significant. Airline travel, lodging and food as well as the technicians' time when all factored in can become extremely cost-prohibitive.

Second, because auto-acquire systems often find an assigned satellite and transmission frequency quicker than a human can, auto-acquire systems often makes it easier to switch satellites in the event of satellite outage (e.g., malfunction) or transition. For example, during the broadcasting of a live event, an existing satellite connection may go down, due to a satellite malfunction. In these cases, it would be technically advantageous to, upon detecting a connection loss, repoint and acquire connection with a different satellite, so as to minimize service disruption during the live event.

In some implementations, a satellite uplink device is a portable (e.g., transportable) device. In some implementations, a satellite auto-acquire device (e.g., a terminal) are also designed as transportable, e.g., housed in a same portable container with a satellite uplink device or a separate portable container, such as within a trunk case or even a suit case.

In some implementations, the preferred satellite is automatically selected (e.g., its position automatically acquired), responsive to a predefined user action on a satellite uplink device. For example, when a user pushes an "Auto-Acquire" button on a satellite uplink device, the uplink device automatically scans a predefined frequency range (e.g., identified in a lookup table), and connects with a satellite working within the predefined frequency range and is available for data transmission. These approaches are technically advantageous, because they simplify the process for establishing a satellite connection, thereby eliminating or reducing the needs for trained technicians to setup and/or maintain the same.

In some implementations, the preferred satellite is automatically selected (e.g., its position automatically acquired), responsive to a predefined user action on a user device communicably connected with the satellite uplink device. For example, a user can use a smartphone or a tablet computer wirelessly (e.g., through a cellular or WIFI connection) connected with an uplink device so as to control the uplink device, such as to initiate a satellite auto-acquire process, to establish and maintain a connection between the uplink device and a satellite, or to switch from one satellite to a different satellite. In some case, technical features, such as auto-acquire, connection testing, or repoint/redirection, are programmed into software applications (e.g., packages, such as smartphone apps), which can be downloaded and executed on a portable user device, thereby increasing system mobility. In some implementations, the user device includes one of: a smart phone, a tablet, or a laptop.

In some implementations, the satellite is selected from the one or more satellites in accordance with transmission speed (e.g., upload speed and download speed) associated with a respective satellite in the plurality of satellites. For example, when two or more satellites are available for broadcasting a live event (e.g., transmitting the mixed digital signals), a satellite having a faster transmission speed (e.g., more bandwidth) is selected over those with slower speeds (e.g., less bandwidth), so as to provide and maintain signal quality.

As another example, when two or more satellites are available for broadcasting a live event (e.g., transmitting the mixed digital signals), a satellite having a faster download speed (but a slower upload speed) is selected over those with slower download speeds (e.g., less download bandwidth), because uplink data transmission are balanced among several satellites, thereby rendering slower download speed more likely to be a potential performance bottleneck.

In some implementations, the satellite is selected from the one or more satellites in accordance with pricing information associated with a respective satellite in the plurality of satellites. For example, when two or more satellites are available for broadcasting a live event (e.g., transmitting the mixed digital signals), a satellite having a lower usage fee (e.g., rental fee) is selected over those with higher fees, so as to take into account budgetary considerations (e.g., where the live event is a small family get-together, and thus budget for having a satellite connection is one of the top concerns).

In some implementations, the satellite is selected from the one or more satellites in accordance with a contractual relationship between a host of the live event and a service provider of the satellite. For example, when two or more satellites are available for broadcasting a live event (e.g., transmitting the mixed digital signals), a satellite covered by a prior contractual agreement (e.g., a satellite rental agreement) is selected over those not covered by the contractual agreement (which would often require more on-the-fly or pay-per-use rental cost).

As another example, an event host or a broadcaster may have a preferred satellite service provider, and this relationship is covered by a satellite service/rental agreement. As a result, satellites made available by a preferred service provider are selected over satellites made available by other providers/vendors, even if both the former and the latter are available at a same time.

In some implementations, the satellite is selected from the plurality of satellites in accordance with a lookup table. For example, the satellite for establishing an uplink connection is selected by looking up information stored on a table (or a database).

In some implementations, for a respective satellite in the one or more satellites, the lookup table includes information representing: satellite identifier, available bandwidth (e.g., upload and/or download), pricing information, satellite provider, satellite coverage (e.g., in view of system 100's increased mobility), satellite location, signal strength, satellite availability, and current status (e.g., connected, unconnected, and primary/second satellite).

FIG. 13 is a block diagram illustrating a satellite auto-acquire lookup table, in accordance with some implementations.

As shown in FIG. 13, the lookup table includes information concerning four different satellites: SAT_001, SAT_002, SAT_003, and SAT_004. Concerning SAT_001, as shown in FIG. 13, SAT_001 has an available upload bandwidth up to 100 Mbps, and download bandwidth 1 Gbps, making it an ideal satellite for broadcasting large-scale live events, such as the GRAMMY AWARD events, where data transmission is critical. SAT_001's rental fee is $6,000 per day, and is provided by the DISH NETWORK.

As also shown in FIG. 13, the SAT_001 covers areas in North American and currently has a high signal strength. Moreover, the SAT_001 is currently available and has connected with an uplink device 122-1 (as shown in FIG. 12).

Concerning SAT_002, as shown in FIG. 13, SAT_002 has an available upload bandwidth up to 5 Mbps, and download bandwidth 1 Mbps, making it an ideal satellite for broadcasting small-scale events, such as family get-together or private live performance, where budget is often an important consideration. SAT_002's rental fee is $500 per hour, and is provided by the service HUGHENET. As also shown in FIG. 13, the SAT_002 covers areas in Asia and currently has a high signal strength. SAT_002, however, is currently unavailable.

Concerning SAT_003, as shown in FIG. 13, SAT_003 has an available upload bandwidth up to 10 Mbps, and download bandwidth 2 Mbps. SAT_003's rental fee is $20,000 per year (e.g., under an annual service agreement), and is provided by the service EXEDE. As also shown in FIG. 13, SAT_003 covers areas in Africa and currently has a medium signal strength. SAT_003 is currently designated as a backup satellite for SAT_001 for broadcasting the live event 100 to regions in Africa.

Concerning SAT_004 (e.g., a dedicated satellite), as shown in FIG. 13, SAT_004 has an available upload bandwidth up to 1.5 Mbps, and download bandwidth 256 Kbps. SAT_004's rental fee is $900 per month (e.g., in accordance with a preferred customer service pricing schedule), and is provided by the service WILDBLUE. As also shown in FIG. 13, SAT_003 covers the city of Palo Alto in the State of California, within the United States. SAT_004 currently has a low signal strength and is currently designated as a second backup satellite for SAT_001 for broadcasting the live event 100 to households in the city of Palo Alto.

In some implementations, for a respective satellite in the one or more satellites, the lookup table includes information representing: bandwidth, pricing information, satellite provider, satellite location, signal strength, and satellite availability. In some implementations, the one or more satellites include satellites provided by multiple distinct commercial entities. For example, satellites available for broadcasting a live event are associated with different commercial entities, e.g., satellite owners and satellite service providers.

In some implementations, the multiple distinct commercial entities (e.g., satellite service providers) include one of: Pittsburgh International Telecommunications, DirecTV, DISH Network, Spiritcast, Sky Angel, GlobeCast World TV, Home2US, Arab Digital Distribution, Arab Radio and Television Network, Orbit Showtime, TopTV, Multichoice, HiTV, Infinity TV, ZAP, DSTV, Airtel digital TV, DD Direct+, Reliance Digital TV, Sun Direct, Tata Sky, Videocon d2h, Astro Nusantara, Indosat Mega Media/IM2, Indovision, TelkomVision, IRIB, SKY PerfecTV!, Astro, DDishTV_LLC, Dream Satellite TV, G Sat, Cignal Digital TV, Dialog TV, Peo TV, TrueVisions, Skylife, Dish Home, Austar, Foxtel, SelecTV, UBI World TV, Australia TV PLUS, Euro1080, Digit-Alb, Premiere, ORF, TV Vlaanderen Digitaal, Belgium Satellite Services, SatelliteBG, Bulsatcom, Vivacom, Digi TV, SEEMORE, NOVA Cyprus, SkyLink, CSLink, UPC Direct, Viasat, ABSat, CanalSat, TPS, Canal Digital, MagtiCom, Sky Deutschland, NOVA Greece, Digi TV, UPC Direct, T-home, Hello HD, Saorsat, Sky Italia, Cyfrowy Polsat, ZON TV Cabo, MEO Satélite, Orange TV, Dolce, Focus Sat, Kosmos TV, TV Plus, Orion Express, RIKOR TV, Russian TV Time, Tricolor TV Sibir, NTV Plus Vostok, Tricolor TV, TotalTV, Magio Sat, UPC Direct, Digital+, Satellite Media Switzerland, OBCOS Switzerland, Digiturk, D-Smart, Sky, Freesat, iSat LTD, NTV Plus Ukraine, Viasat Ukraine, ВОЛЯ (Cable), Максимум ТВ (MITRIS), Xtra TV, Bell TV, Shaw Direct, Spiritcast, Glorystar, Telus TV, Antina, SKY Brasil, Vivo TV, Oi TV, GVT TV, Telefónica TV Digital, Claro TV, Movistar TV Hogar, Cable Mágico Satelital, DirecTV Latin America, Tuves HD, Movistar Venezuela, SKY México, Dish México, and Cablevisión México Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for controlling a terrestrial satellite uplink device to be positioned to distribute an audio or visual feed, the method comprising:
at a computing device having one or more processors and memory storing one or more programs for execution by the one or more processors:
obtaining data from one or more automatic sensor devices associated with the terrestrial satellite uplink device;
determining the location of one or more satellites in orbit;
selecting a preferred satellite from the one or more satellites based upon a current available upload bandwidth associated with each respective satellite in the one or more satellites and a rental fee for uploading data to each respective satellite in the one or more satellites;
calculating an optimal position of the terrestrial satellite uplink device to connect with the preferred satellite based on at least the data collected from the one or more automatic sensor devices;
providing actuator commands to control one or more actuators to automatically position the terrestrial satellite uplink device to said calculated optimal position without human intervention; and
at the terrestrial satellite uplink device, upon being positioned in the calculated optimal position: establishing a new connection or adjusting an existing connection with the preferred satellite; and
processing and transmitting RF signals, comprising audio or visual feed from the terrestrial satellite uplink device, to the preferred satellite.

2. The method of claim 1, wherein the providing comprises:
determining one or more actuator commands to position the terrestrial satellite uplink device to the calculated optimal position; and
sending the one or more actuator commands to the one or more actuators connected to the terrestrial satellite uplink device, the one or more actuators being configured to position the terrestrial satellite uplink device to said calculated optimal position in accordance with the actuator commands.

3. The method of claim 1, wherein the terrestrial satellite uplink device is mounted to a control actuator configured to control the one or more actuators, wherein the providing comprises:
determining a plurality of actuator commands to position the terrestrial satellite uplink device to the calculated optimal position; and
sending the plurality of actuator commands to the control actuator, which then selectively provides a subset of the plurality of actuator commands to a respective actuator of the one or more actuators.

4. The method of claim 1, further comprising communicating a status of the terrestrial satellite uplink device to a remote system.

5. The method of claim 1, further comprising communicating a status of a connection between the terrestrial satellite uplink device and the preferred satellite in orbit to a remote system.

6. The method of claim 1, wherein calculating an optimal position of the terrestrial satellite uplink device further comprises comparing data from a respective automatic sensor device of the one or more automatic sensor devices to values for the respective sensor device in a lookup table.

7. The method of claim 1, wherein a respective automatic sensor device in the one or more automatic sensor devices is a positioning device selected from the group consisting of: an inclinometer, a digital compass, and a Global Positioning System (GPS).

8. The method of claim 1, wherein a respective automatic sensor device in the one or more automatic sensor devices is a field condition device selected from the group consisting of: a thermometer, a hygrometer, an anemometer, a barometer, a ceilometer and a transmissometer.

9. The method of claim 1, wherein a respective actuator of the one or more actuators is a step motor.

10. The method of claim 1, further comprising:
automatically re-positioning the terrestrial satellite uplink device from the optimal position to a second position.

11. The method of claim 5, further comprising:
automatically re-positioning the terrestrial satellite uplink device from the optimal position to a second position according to the status of the connection between the uplink device and the preferred satellite.

12. The method of claim 1, wherein providing actuator commands to position the terrestrial satellite uplink device in the calculated optimal position comprises at least a command to change position of the uplink device by a first angle in a plurality of angles in a vertical plane.

13. The method of claim 1, wherein providing actuator commands to position the terrestrial satellite uplink device in the calculated optimal position comprises at least a command to change a position of the uplink device by a first angle in the plurality of angles in a horizontal plane.

14. The method of claim 1, wherein providing actuator commands to position the terrestrial satellite uplink device in the calculated optimal position comprises at least a command to change a position of the uplink device by a first distance in a plurality of distances in a vertical plane.

15. The method of claim 1, wherein providing actuator commands to position the terrestrial satellite uplink device in the calculated optimal position comprises at least a command to change a position of the uplink device by a first distance in the plurality of distances in a horizontal plane.

16. The method of claim 1, wherein providing actuator commands to position the terrestrial satellite uplink device in the calculated optimal position comprises at least a command to change a position of the uplink device by a first distance in a plurality of distances forward or backward relative to a starting position.

17. The method of claim 1, wherein the preferred satellite is selected from the one or more satellites automatically without human intervention.

18. The method of claim 1, wherein the preferred satellite is selected from the one or more satellites in accordance with a lookup table.

19. The method of claim 18, wherein, for a respective satellite in the one or more satellites, the lookup table includes information representing: bandwidth, pricing information, satellite provider, satellite coverage, signal strength, and satellite availability.

20. The method of claim 19, wherein the one or more satellites include satellites provided by multiple distinct commercial entities.

21. A system comprising a terrestrial satellite uplink device and a controller, the controller in electrical communication with the terrestrial satellite uplink device to position the terrestrial satellite uplink device so that the terrestrial satellite uplink device can distribute an audio or visual feed, the controller comprising:

one or more processors; and
memory storing one or more programs to be executed by the one or more processors;
the one or more programs comprising instructions for:
obtaining data from one or more automatic sensor devices associated with the terrestrial satellite uplink device;
determining the location of one or more satellites in orbit;
selecting a preferred satellite from the one or more satellites based upon a current available upload bandwidth associated with each respective satellite and a rental fee for uploading data to each respective satellite in the one or more satellites;
calculating an optimal position of the terrestrial satellite uplink device to connect with the preferred satellite based on at least the data collected from the one or more automatic sensor devices; and
providing actuator commands to control the one or more actuators to automatically position the terrestrial satellite uplink device to said calculated optimal position without human intervention; and
the terrestrial satellite uplink device, upon being positioned in the calculated optimal position, comprising instructions for:
establishing a new connection or adjusting an existing connection with the preferred satellite; and
processing and transmitting RF signals from the terrestrial satellite uplink device, comprising audio or visual feed, to the preferred satellite.

22. The method of claim 1, wherein the one or more satellites is a plurality of satellites.

23. The system of claim 21, wherein the one or more satellites is a plurality of satellites.

* * * * *